US012785487B2

(12) United States Patent
Tatebe et al.

(10) Patent No.: US 12,785,487 B2
(45) Date of Patent: Nov. 3, 2026

(54) STATOR, ROTARY ELECTRICAL MACHINE, METHOD FOR MANUFACTURING STATOR, AND METHOD FOR MANUFACTURING ROTARY ELECTRICAL MACHINE

(71) Applicant: Mitsubishi Electric Corporation, Tokyo (JP)

(72) Inventors: Akiko Tatebe, Tokyo (JP); Ryo Nabika, Tokyo (JP); Hiroki Aso, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 18/853,363

(22) PCT Filed: Jun. 1, 2023

(86) PCT No.: PCT/JP2023/020479
§ 371 (c)(1),
(2) Date: Oct. 1, 2024

(87) PCT Pub. No.: WO2024/004510
PCT Pub. Date: Jan. 4, 2024

(65) Prior Publication Data

US 2025/0219491 A1 Jul. 3, 2025

(30) Foreign Application Priority Data

Jun. 28, 2022 (JP) ................................ 2022-103206

(51) Int. Cl.
*H02K 15/12* (2025.01)
*H02K 1/14* (2006.01)
(Continued)

(52) U.S. Cl.
CPC ............... *H02K 3/345* (2013.01); *H02K 1/14* (2013.01); *H02K 15/026* (2013.01);
(Continued)

(58) Field of Classification Search
CPC ...... H02K 3/345; H02K 15/40; H02K 15/121; H02K 15/026; H02K 15/095; H02K 1/14
(Continued)

(56) References Cited

U.S. PATENT DOCUMENTS

2011/0020154 A1 1/2011 Matsuda et al.
2013/0169106 A1 7/2013 Yokogawa et al.
(Continued)

FOREIGN PATENT DOCUMENTS

JP 2010158099 A 7/2010
JP 2011030328 A 2/2011
(Continued)

OTHER PUBLICATIONS

International Search Report (PCT/ISA/210) with translation and Written Opinion (PCT/ISA/237) mailed on Aug. 1, 2023, by the Japan Patent Office as the International Searching Authority for International Application No. PCT/JP2023/020479. (9 pages).

*Primary Examiner* — Terrance L Kenerly
(74) *Attorney, Agent, or Firm* — BUCHANAN, INGERSOLL & ROONEY PC

(57) ABSTRACT

A core having an annular core-back portion and a plurality of tooth portions formed, at intervals in a circumferential direction, on an inner circumferential surface of the core-back portion to protrude, a coil wound around each tooth portion with an insulator therebetween, and a mold resin portion coating the core and the coil, are included. The core-back portion is formed to be discontinuous at at least one position in the circumferential direction. The insulator has, at two or more positions in the circumferential direction, protrusions protruding to an outer side in a radial direction beyond an outer circumferential surface of the core-back portion. The mold resin portion does not coat a
(Continued)

protrusion surface, along an axial direction, on the outer side in the radial direction of each protrusion.

19 Claims, 38 Drawing Sheets

(51) Int. Cl.

| | |
|---|---|
| ***H02K 3/34*** | (2006.01) |
| ***H02K 15/026*** | (2025.01) |
| ***H02K 15/095*** | (2006.01) |
| ***H02K 15/121*** | (2025.01) |
| ***H02K 15/40*** | (2025.01) |

(52) U.S. Cl.
CPC ......... *H02K 15/095* (2013.01); *H02K 15/121* (2025.01); *H02K 15/40* (2025.01)

(58) Field of Classification Search
USPC .................................................. 310/254, 194
See application file for complete search history.

(56) References Cited

U.S. PATENT DOCUMENTS

| | | | |
|---|---|---|---|
| 2019/0036388 | A1 | 1/2019 | Yamasaki et al. |
| 2023/0071188 | A1 | 3/2023 | Takahashi et al. |

FOREIGN PATENT DOCUMENTS

| | | | |
|---|---|---|---|
| JP | 2012010550 | A | 1/2012 |
| JP | 5274091 | B2 | 8/2013 |
| JP | 2013153643 | A | 8/2013 |
| JP | 2018093582 | A | 6/2018 |
| JP | 2019030111 | A | 2/2019 |
| WO | 2021171435 | A1 | 9/2021 |
| WO | 2022101975 | A1 | 5/2022 |

110

110

STATOR, ROTARY ELECTRICAL MACHINE, METHOD FOR MANUFACTURING STATOR, AND METHOD FOR MANUFACTURING ROTARY ELECTRICAL MACHINE

TECHNICAL FIELD

The present disclosure relates to a stator, a rotary electrical machine, a method for manufacturing a stator, and a method for manufacturing a rotary electrical machine.

BACKGROUND ART

Conventionally, a structure in which molding is performed on an annular core around which a conductive wire has been wound with an insulator therebetween, has been known as a stator for a rotary electrical machine. By dividing the core into a plurality of core pieces, the density at the time of winding can be increased, and a core-pressing machine can be downsized. However, in order to ensure post-molding roundness of the stator, the core pieces need to be fixed to each other through welding, press-fitting, or the like, whereby machining cost and equipment cost increase. In addition, since the core must not be exposed from the outer circumference of the stator formed from a mold resin, a method including directly applying pressure to the core by a mold cannot be employed.

In order to solve these problems, a method is proposed in Patent Document 1, for example. This method includes: arranging core pieces in an annular pattern and constraining the core pieces with jigs; performing molding in slot portions in this state, to provisionally fix the core pieces; subsequently detaching the jigs; and subsequently performing molding with an outer circumference portion of the core being included. In addition, another method is proposed in Patent Document 2, for example. This method is based on an example of an outer-rotor stator, but is also applicable to an inner-rotor stator in the same manner. This method includes: using such an insulator that an annular groove is formed by arranging core pieces in an annular pattern; and inserting a ring member into the formed annular groove. Consequently, this method ensures post-molding roundness.

CITATION LIST

Patent Document

Patent Document 1: Japanese Patent No. 5274091
Patent Document 2: Japanese Laid-Open Patent Publication No. 2018-93582

SUMMARY OF THE INVENTION

Problem to be Solved by the Invention

In a conventional document (e.g., Patent Document 1), equipment cost for a welding machine, press-fitting equipment, and the like is decreased, but the number of molding steps is increased to two, whereby a problem arises in that machining cost cannot be decreased. In addition, in, for example, Patent Document 2, the ring member is necessary, whereby a problem arises in that the number of components is increased.

The present disclosure has been made to solve the above problems, and an object of the present disclosure is to provide a stator, a rotary electrical machine, a method for manufacturing a stator, and a method for manufacturing a rotary electrical machine in which favorable roundness is imparted without increasing machining cost, equipment cost, or the number of components.

Means to Solve the Problem

A stator according to the present disclosure is
a stator including:
a core having
- a core-back portion formed in an annular shape and
- a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and
a mold resin portion coating the core and the coil, wherein
the core-back portion is formed to be discontinuous at at least one position in the circumferential direction,
the insulator has, at each of two or more positions in the circumferential direction, a protrusion protruding to an outer side in the radial direction beyond an outer circumferential surface of the core-back portion, and
the mold resin portion does not coat a protrusion surface which is located on the outer side in the radial direction of the protrusion and which extends along an axial direction.

Another stator according to the present disclosure is
a stator including:
a core having
- a core-back portion formed in an annular shape and
- a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and
a mold resin portion coating the core and the coil, wherein
the core-back portion is formed to be discontinuous at at least one position in the circumferential direction,
the insulator has, at each of two or more positions in the circumferential direction, a protrusion protruding to an outer side in the radial direction beyond an outer circumferential surface of the core-back portion,
the protrusion is formed on one end side in an axial direction of the core-back portion,
the protrusion has an extension portion formed along the outer circumferential surface on the outer side in the radial direction of the core-back portion of the core so as to extend to a center side in the axial direction, and
the extension portion of the protrusion formed on the one end side in the axial direction is formed such that a thickness in the radial direction of the extension portion decreases toward the one end side in the axial direction from a center-side end surface in the axial direction of the extension portion.

Also, a rotary electrical machine according to the present disclosure is
a rotary electrical machine including:
the above stator;
a rotor rotatably and coaxially disposed on the inner side in the radial direction of the stator; and
a bracket which is disposed on at least one end in the axial direction of the stator and which holds a bearing holding a rotation shaft of the rotor.

Also, a method for manufacturing the stator according to the present disclosure is a method including steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion; and a molding step of performing coating with a mold resin such that the protrusion surface of the protrusion is exposed, to form the stator.

Also, a method for manufacturing a rotary electrical machine according to the present disclosure is a method including steps to be sequentially performed, the steps being:

a disposition step of disposing a rotatable and coaxial rotor or the inner side in the radial direction of the stator formed through the above method for manufacturing the stator; and an attaching step of attaching, to at least one end in the axial direction of the stator, a bracket which holds a bearing holding a rotation shaft of the rotor.

Effect of the Invention

The stator, the rotary electrical machine, the method for manufacturing a stator, and the method for manufacturing a rotary electrical machine according to the present disclosure lead to obtainment of a stator, a rotary electrical machine, a method for manufacturing a stator, and a method for manufacturing a rotary electrical machine in which favorable roundness is imparted without increasing machining cost or the number of components.

BRIEF DESCRIPTION OF THE DRAWINGS

FIG. 19 is a plan view showing a state where a winding step is being performed in the case of disposing insulators on the core shown in FIG. 18.

DESCRIPTION OF EMBODIMENTS

Figure 1:
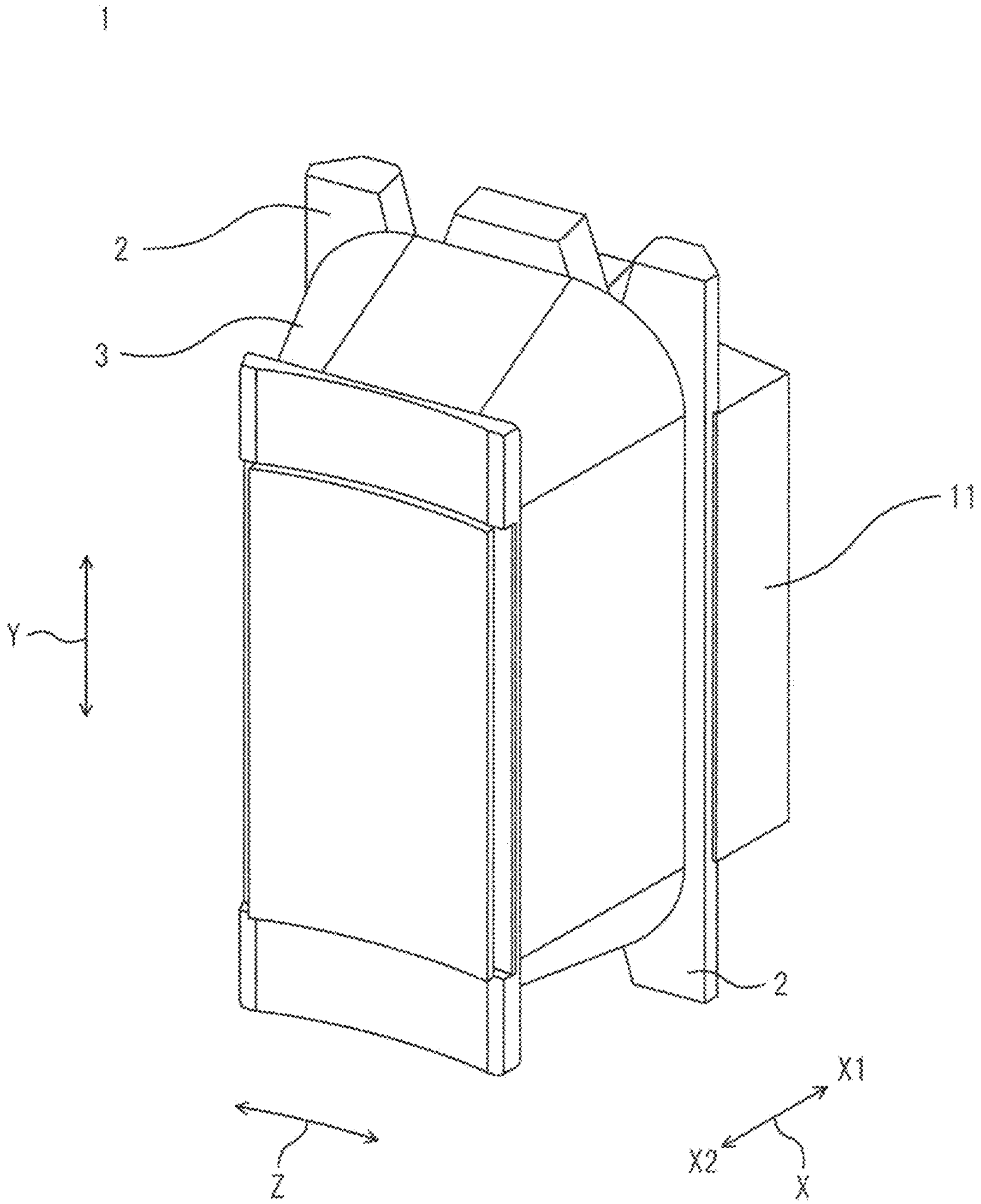
FIG. 1 is a perspective view showing a configuration of a division coil-wound body according to embodiment 1.

In the following description, directions in a rotary electrical machine are defined as a circumferential direction Z, an axial direction Y, and a radial direction X which extends to an outer side X1 and an inner side X2. Thus, for a stator and a rotor composing the rotary electrical machine and portions composing the stator and the rotor as well, these directions are the same, and description will be given with these directions being indicated as references. Rotary electrical machines shown in the drawings are merely examples, and the number of poles and the number of slots of each of the rotary electrical machines may be increased or decreased as appropriate.

Embodiment 1

Figure 2:
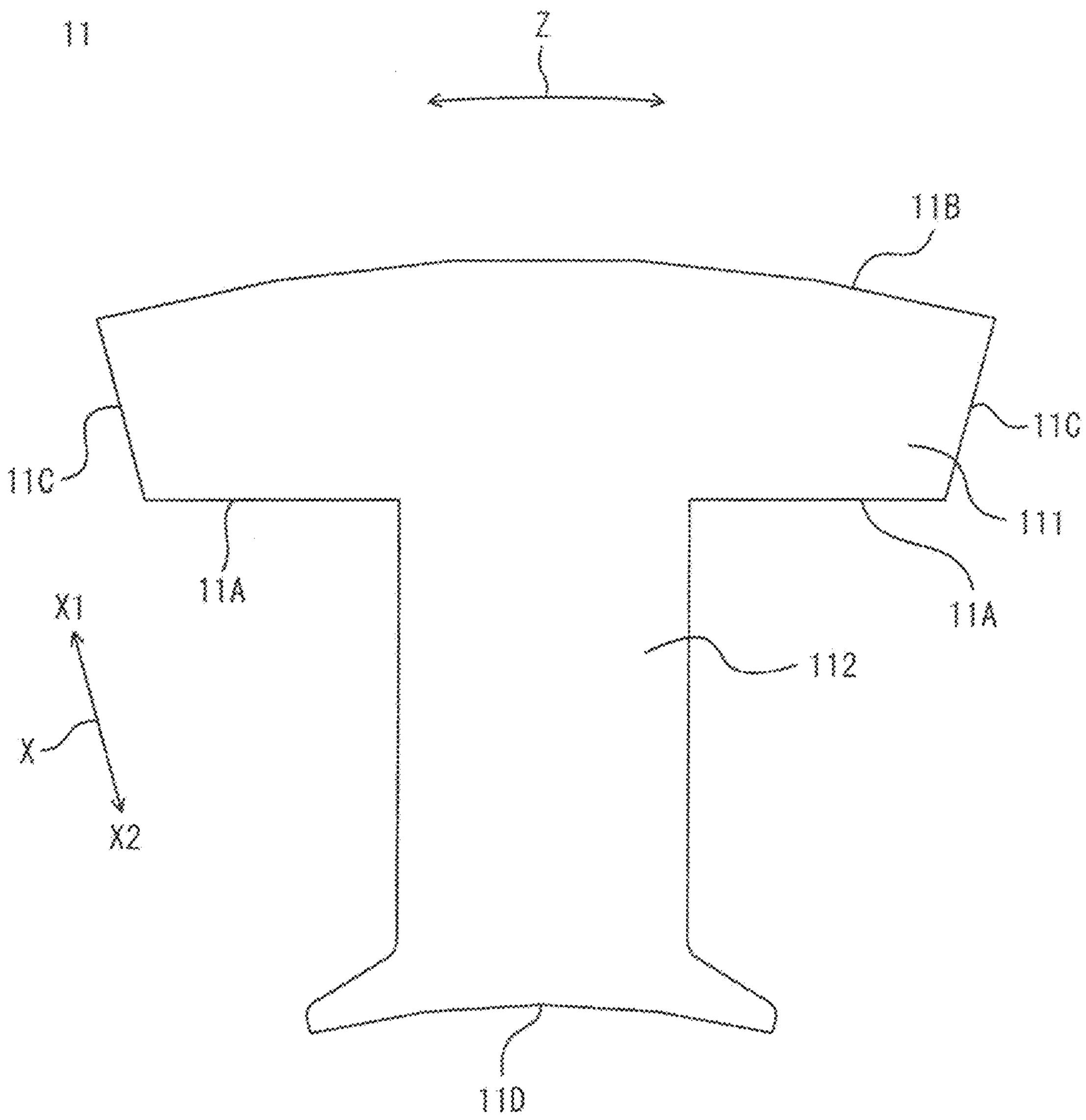
FIG. 2 is a plan view showing a configuration of a division core piece as a part of the division coil-wound body shown in FIG. 1.
Figure 3:
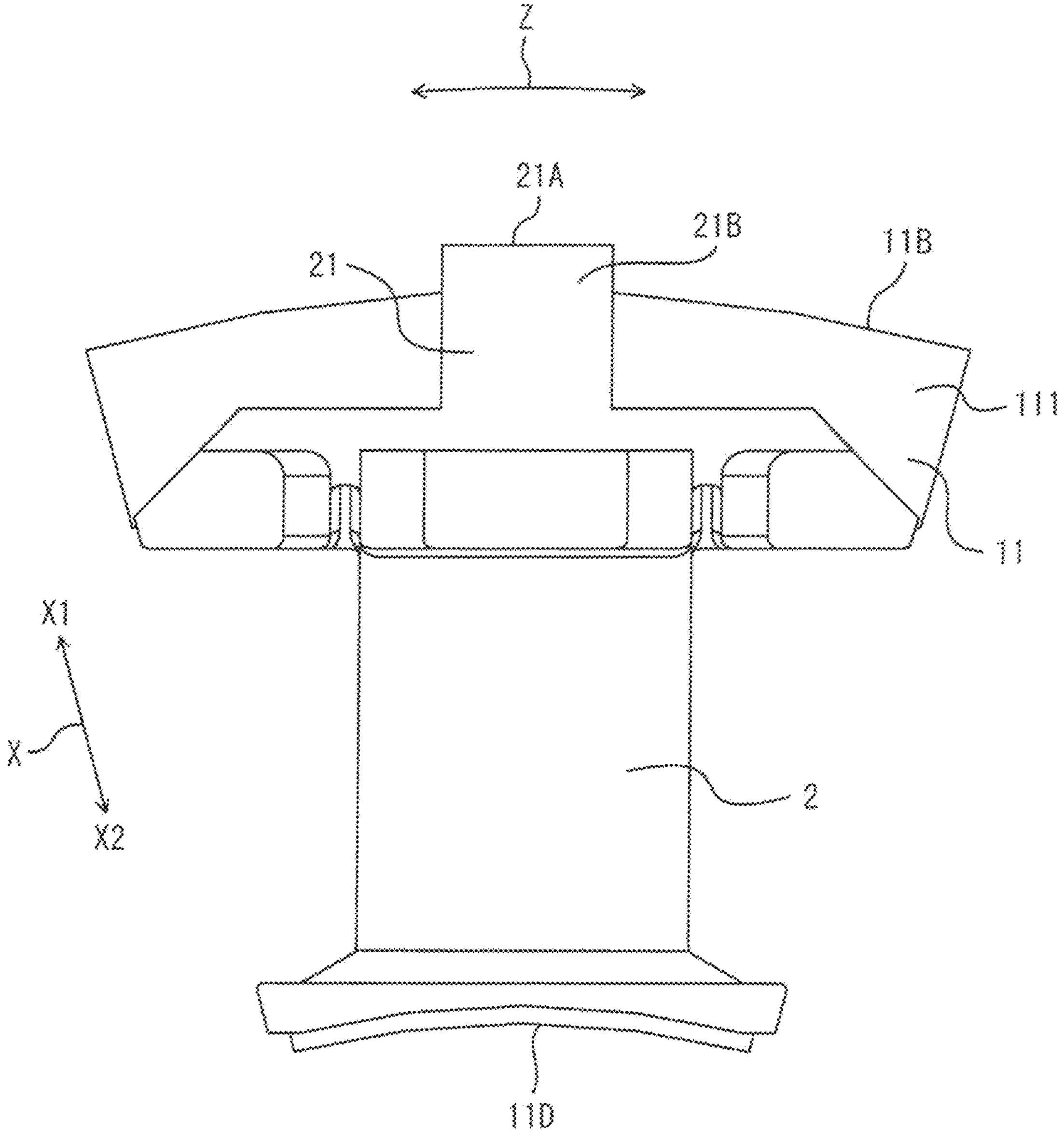
FIG. 3 is a plan view showing a configuration in which an insulator is disposed on the division core piece shown in FIG. 2.
Figure 4:
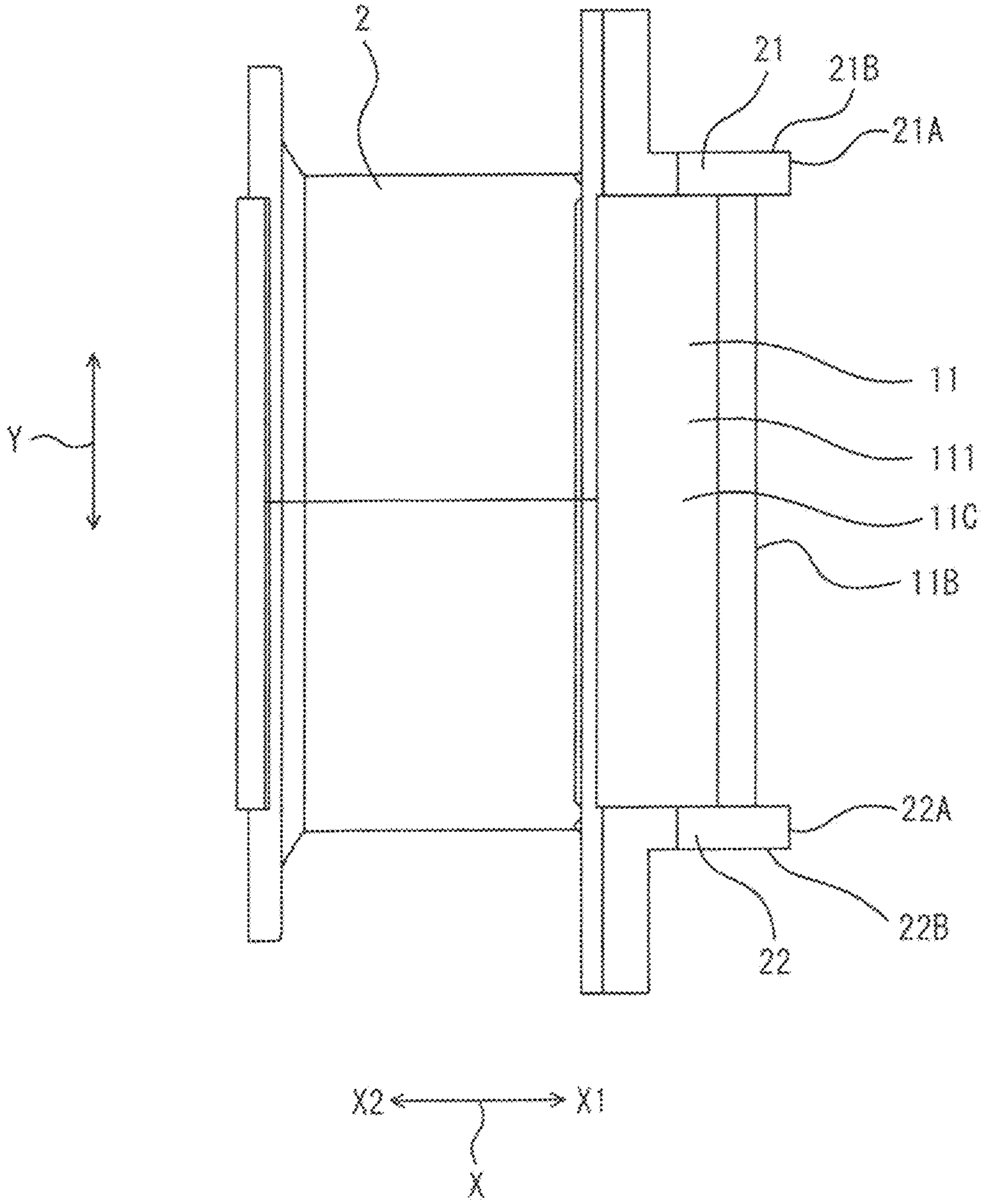
FIG. 4 is a side view showing the configuration in which the insulator is disposed on the division core piece shown in FIG. 2.
Figure 5:
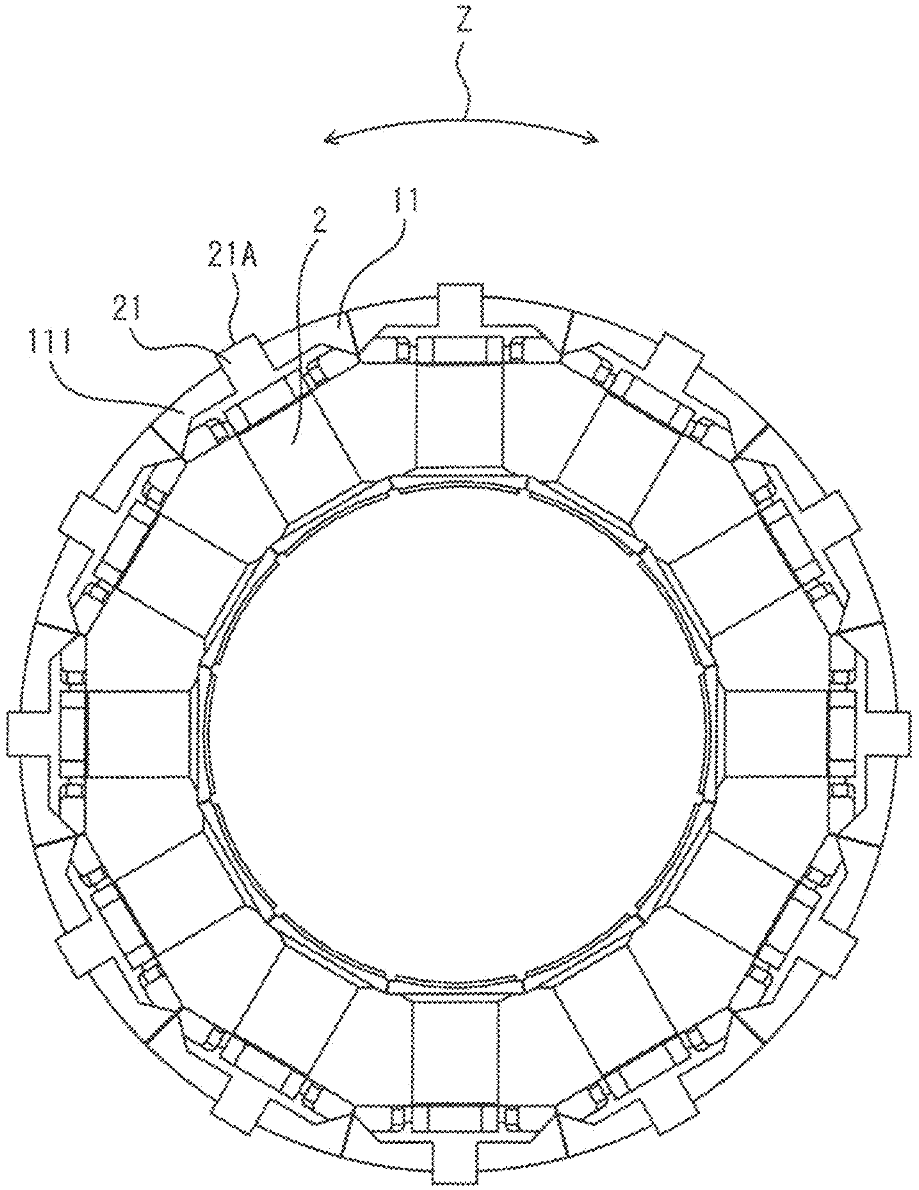
FIG. 5 is a plan view showing a configuration in which a plurality of division coil-wound bodies each of which is the division coil-wound body shown in FIG. 1 are arranged in an annular pattern.
Figure 6:
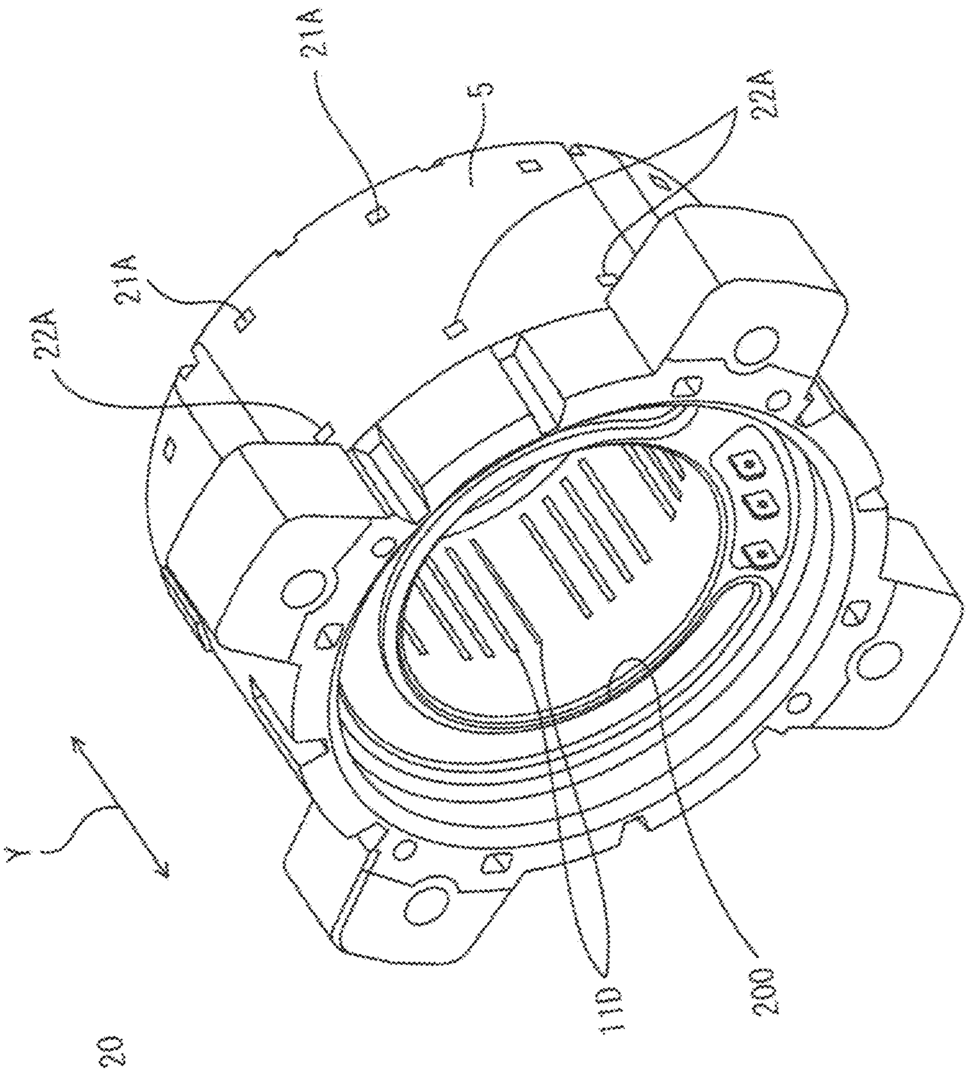
FIG. 6 is a perspective view showing a configuration of a stator according to embodiment 1.
Figure 7:
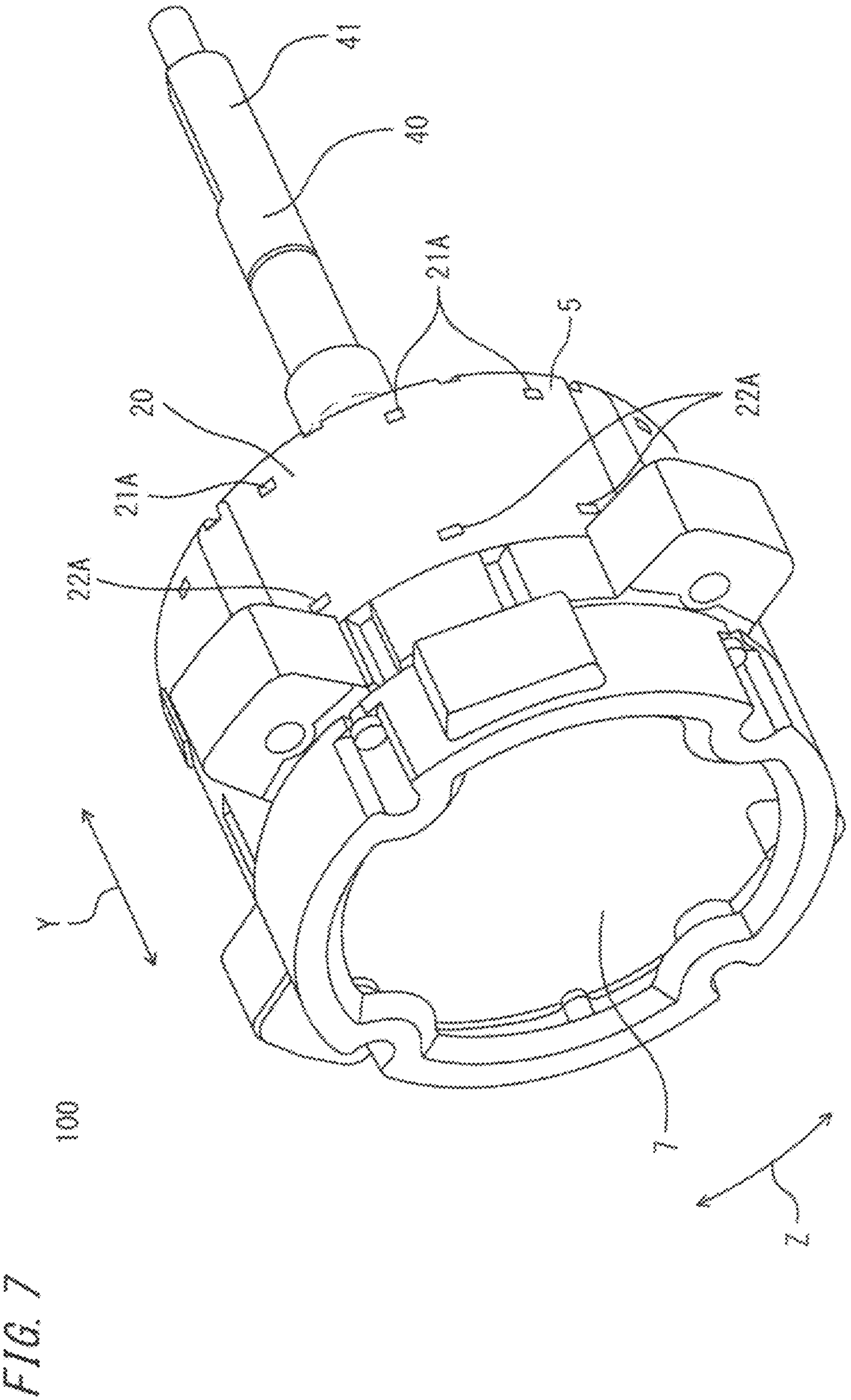
FIG. 7 is a perspective view showing a configuration of a rotary electrical machine in which the stator shown in FIG. 6 is used.
Figure 27:
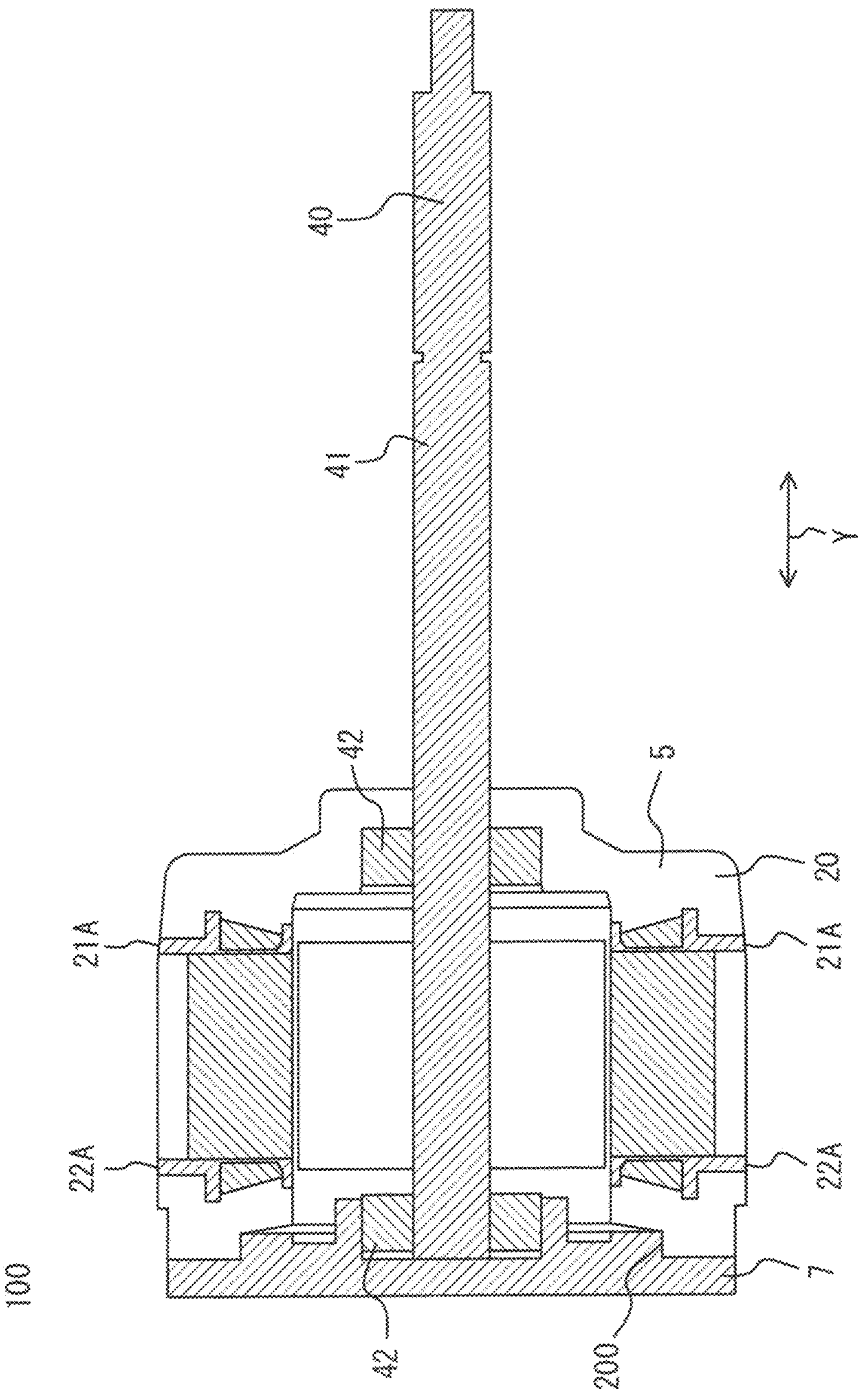
FIG. 27 is a cross-sectional view showing the configuration of the rotary electrical machine shown in FIG. 7.

FIG. 1 is a perspective view showing a configuration of a division coil-wound body according to embodiment 1. FIG. 2 is a plan view showing a configuration of a division core piece as a part of the division coil-wound body shown in FIG. 1. FIG. 3 is a plan view showing a configuration in which an insulator is disposed on the division core piece shown in FIG. 2. FIG. 4 is a side view showing the configuration in which the insulator is disposed on the division core piece shown in FIG. 2. FIG. 5 is a plan view showing a configuration in which a plurality of division coil-wound bodies each of which is the division coil-wound body shown in FIG. 1 are arranged in an annular pattern. FIG. 6 is a perspective view showing a configuration of a stator according to embodiment 1. FIG. 7 is a perspective view showing a configuration of a rotary electrical machine in which the stator shown in FIG. 6 is used. FIG. 27 is a cross-sectional view showing the configuration of the rotary electrical machine shown in FIG. 7. However, in FIG. 27, the external shape of a mold resin portion 5 described later is shown in a simplified manner unlike in FIG. 7.

Figure 8:
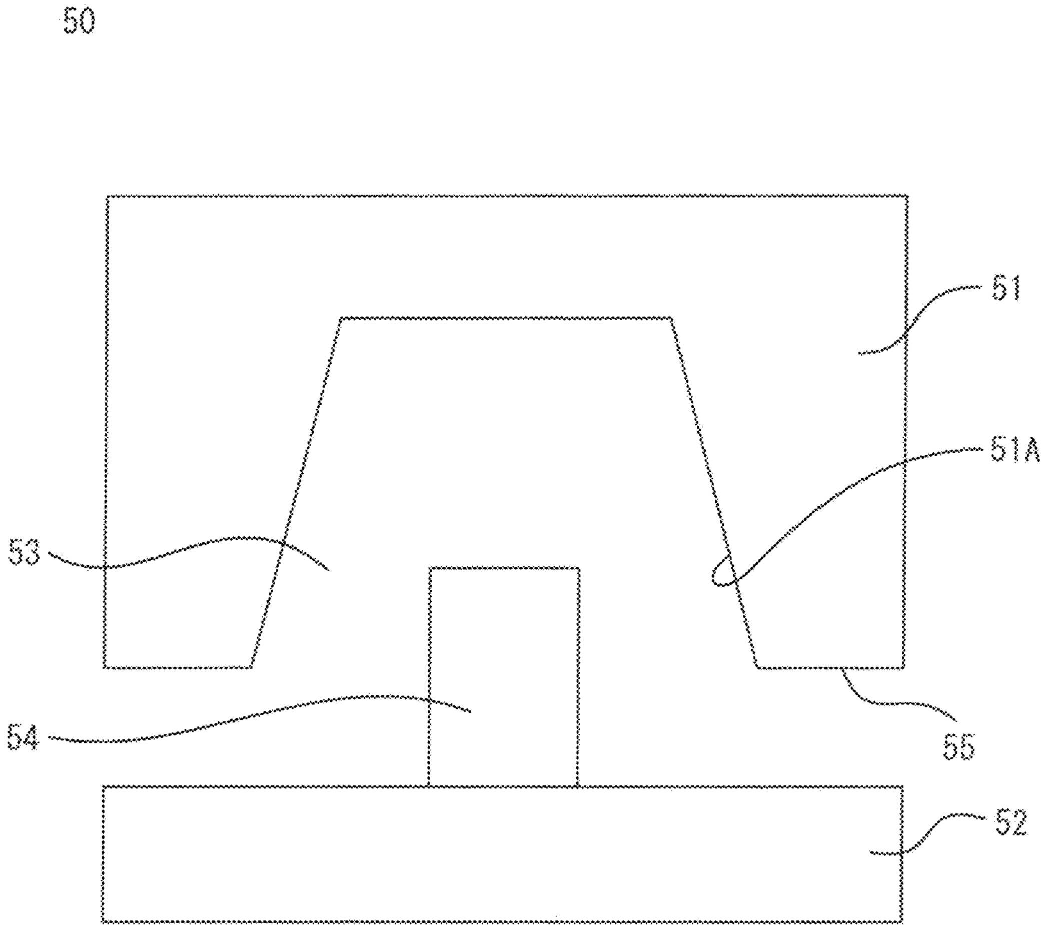
FIG. 8 is a schematic cross-sectional view showing a configuration of a molding mold in embodiment 1.
Figure 9:
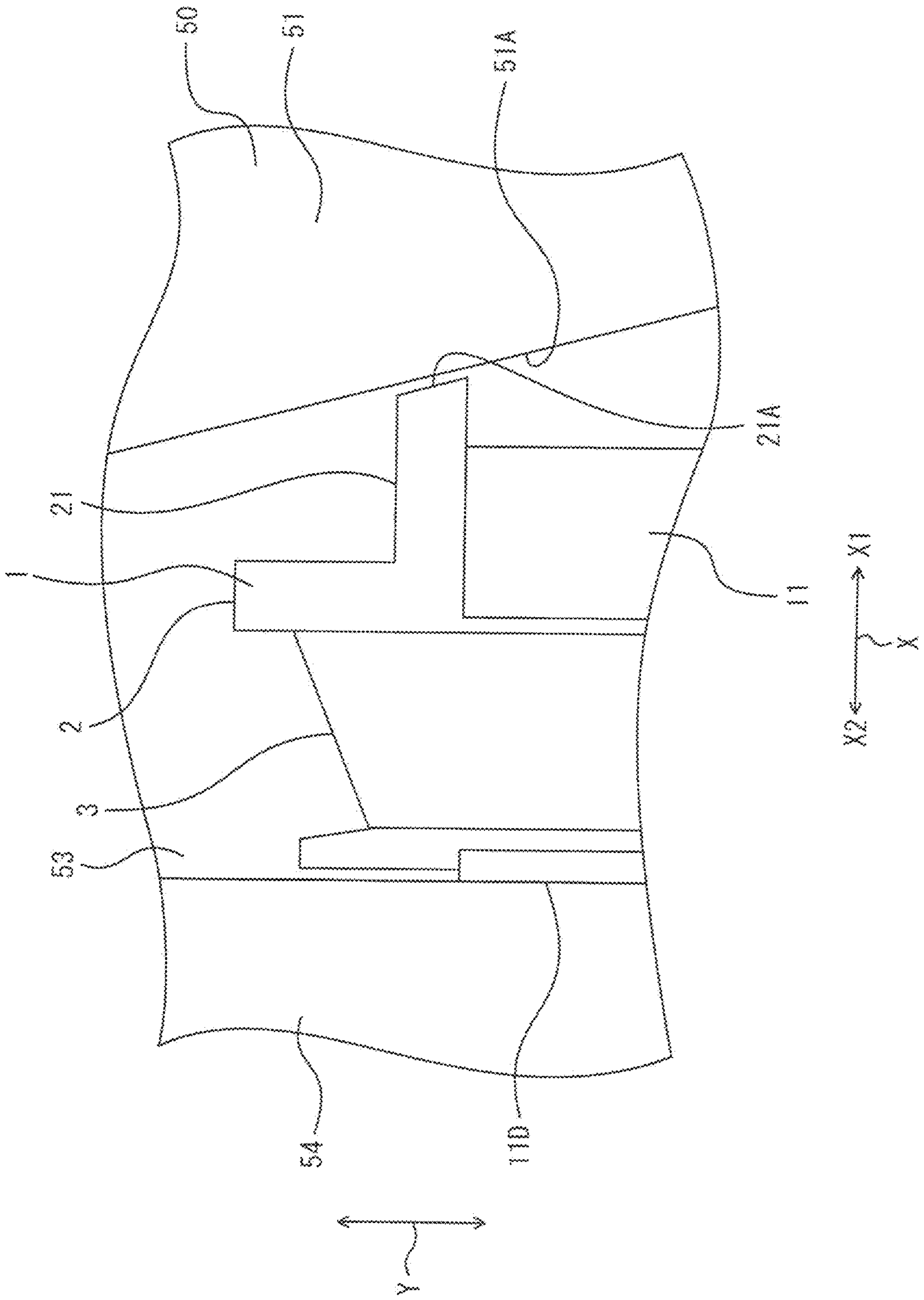
FIG. 9 is an enlarged schematic view showing an arrangement relationship between the molding mold shown in FIG. 8 and the upper side (on the drawing sheet) in an axial direction of the division coil-wound body shown in FIG. 1.
Figure 10:
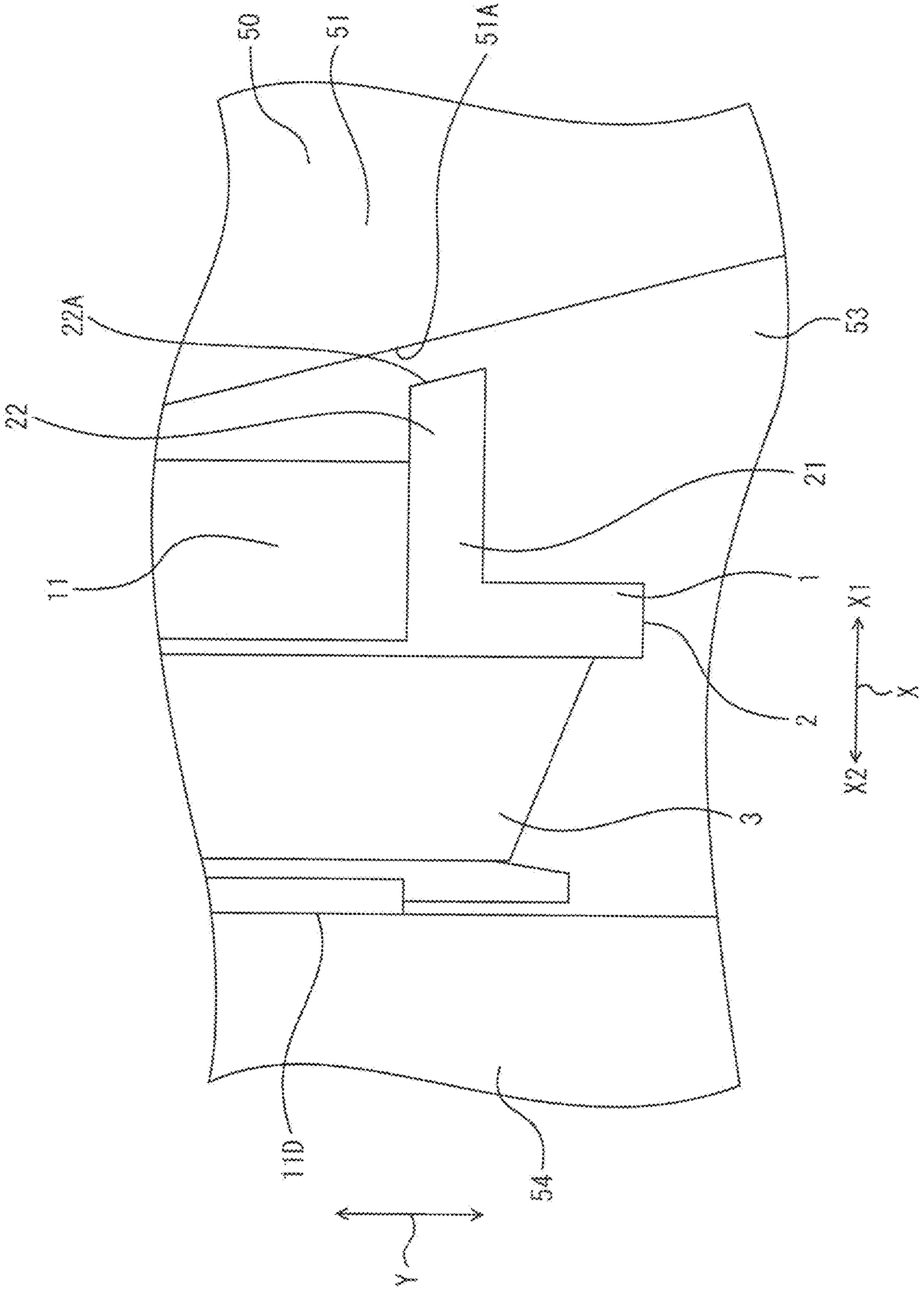
FIG. 10 is an enlarged schematic view showing an arrangement relationship between the molding mold shown in FIG. 8 and the lower side (on the drawing sheet) in the axial direction of the division coil-wound body shown in FIG. 1.
Figure 11:
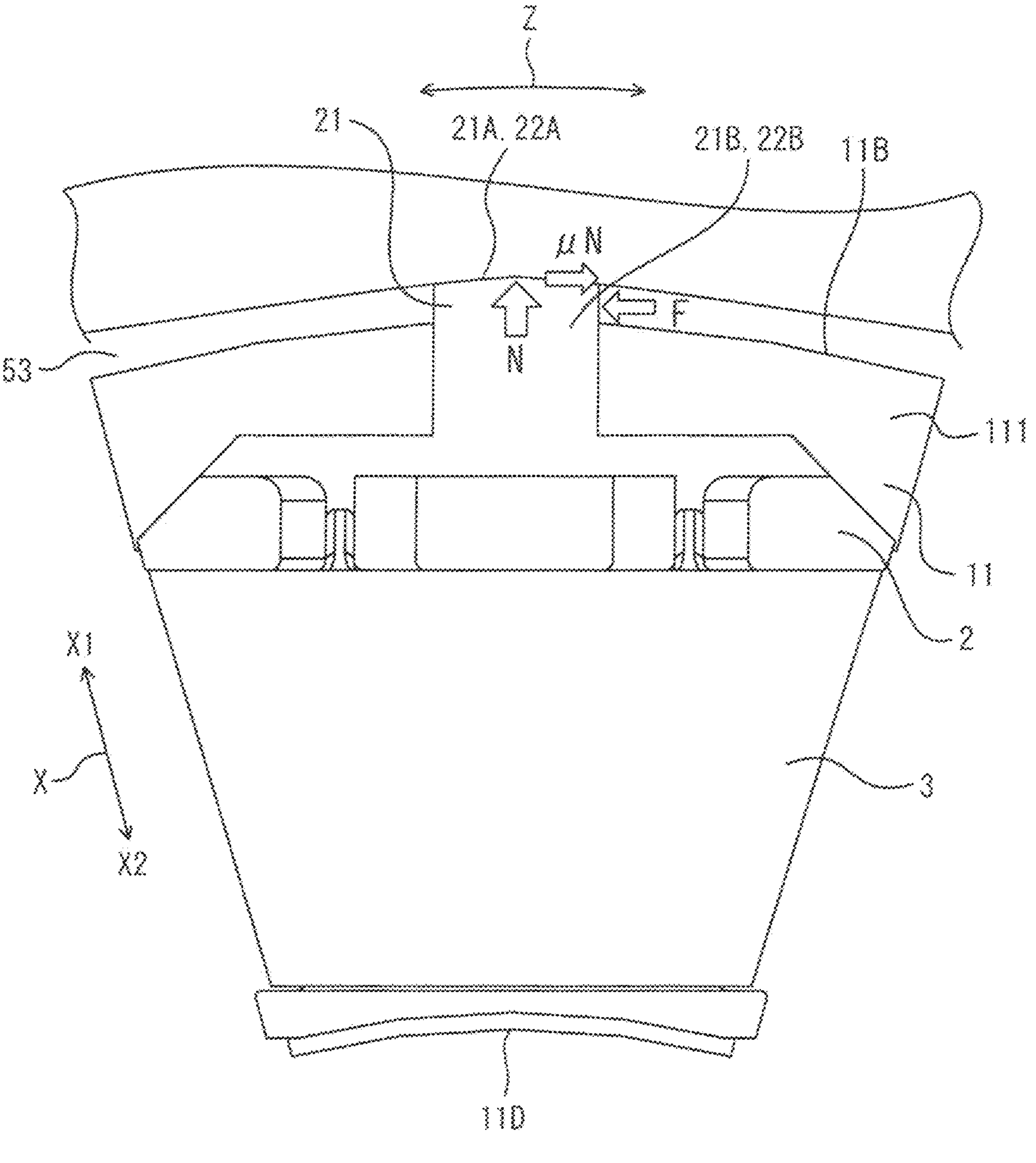
FIG. 11 is a plan view showing the relationship between forces of a mold resin and the division coil-wound body (shown in FIG. 1) disposed in the molding mold shown in FIG. 8.
Figure 12:
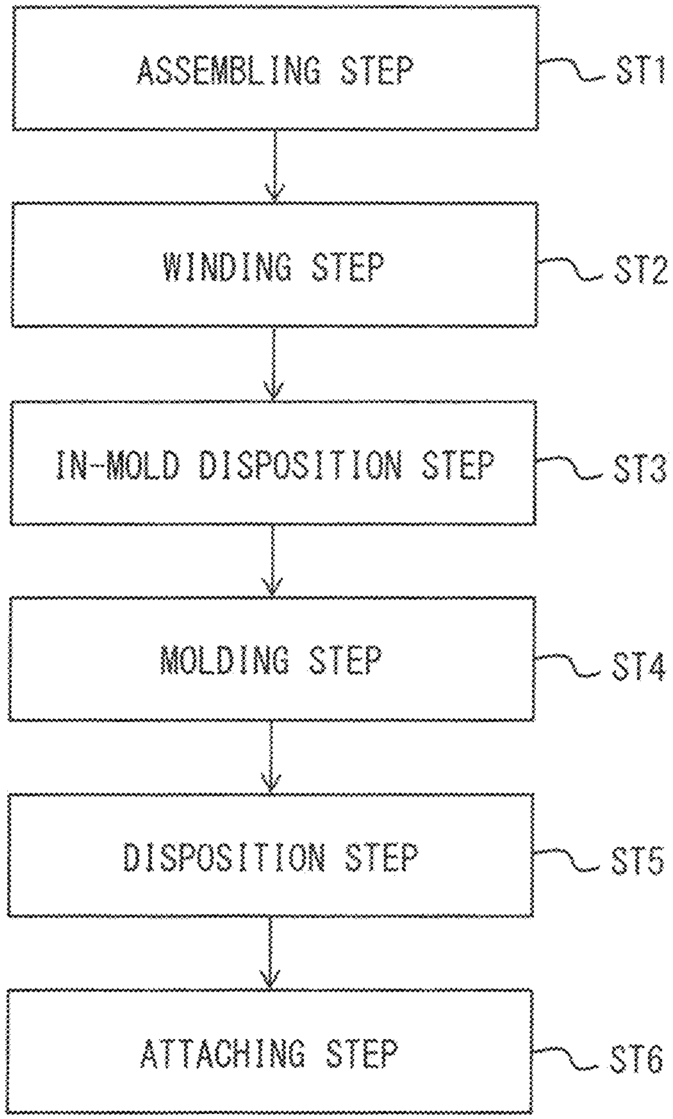
FIG. 12 is a flowchart showing a process for manufacturing the rotary electrical machine according to embodiment 1.

FIG. 8 is a schematic cross-sectional view showing a configuration of a molding mold in embodiment 1. FIG. 9 is an enlarged schematic view showing the upper side (on the drawing sheet) in the axial direction regarding an arrangement relationship between the division coil-wound body shown in FIG. 1 and the molding mold shown in FIG. 8. FIG. 10 is an enlarged schematic view showing the lower side (on the drawing sheet; in the axial direction regarding an arrangement relationship between the division coil-wound body shown in FIG. 1 and the molding mold shown in FIG. 8. FIG. 11 is a plan view showing the relationship between forces of a mold resin and the division coil-wound body (shown in FIG. 1) disposed in the molding mold shown in FIG. 8. FIG. 12 is a flowchart showing a method for manufacturing the rotary electrical machine according to embodiment 1.

As shown in FIG. 1, a division coil-wound body 1 is a part of a stator 20 (FIG. 6) of a rotary electrical machine 100 (FIG. 7) described later. The division coil-wound body 1 has: a division core piece 11; an insulator 2 disposed on the division core piece 11; and a coil 3 formed by winding a conductive wire around the division core piece 11 with the insulator 2 therebetween.

As shown in FIG. 2, the division core piece 11 of the division coil-wound body 1 shown in FIG. 1 has: a core-back portion 111 extending in the circumferential direction Z; and a tooth portion 112 formed on an inner circumferential surface 11A on the inner side X2 in the radial direction X of the core-back portion 111 so as to protrude to the inner side X2 in the radial direction X. The outer side X1 in the radial direction X of the core-back portion 111 is defined as an outer circumferential surface 11B, both ends in the circumferential direction Z of the core-back portion 111 are defined as end surfaces 11C, and the inner side X2 in the radial direction X of the tooth portion 112 is defined as a distal-end surface 11D. The division core piece 11 is formed by, for example, stacking a plurality of electromagnetic steel sheets in the axial direction Y and fixing the electromagnetic steel sheets to each other through interlocking, welding, or adhesion.

FIG. 3 and FIG. 4 each show a state where the insulator 2 is disposed on the division core piece 11. The insulator 2 includes, on both end sides thereof in the axial direction Y, protrusions 21 and 22 extending in the radial direction X toward the outer circumferential surface 11B of the core-back portion 111. Each of the protrusions 21 and 22 is formed such that the outer side X1 thereof in the radial direction X protrudes to the outer side X1 in the radial direction X beyond the outer circumferential surface 11B of the core-back portion 111. The protrusions 21 and 22 respectively have, at the farthest positions thereof on the outer side X1 in the radial direction X, protrusion surfaces 21A and 22A extending along the axial direction Y. In addition, the protrusion surfaces 21A and 22A are formed to have slopes relative to the axial direction Y. The slopes will be described in detail in relation to a method for manufacturing the stator 20. The protrusions 21 and 22 further have end surfaces on sides opposite to the division core piece 11 in the axial direction Y, the end surfaces being defined as axial-end surfaces 21B and 22*b*.

The insulator 2 is molded from, for example, an insulative thermoplastic resin or the like and covers the division core piece 11 excluding the distal-end surface 110 on the inner side X2 in the radial direction X of the tooth portion 112, the end surfaces 11C at both ends in the circumferential direction Z of the core-back portion 111, and a part of the outer circumferential surface 11B on the outer side X1 in the radial direction X of the core-back portion 111, to insulate the division core piece 11 and the coil 3.

When a plurality of division coil-wound bodies 1 each of which is the division coil-wound body 1 shown in FIG. 1 are arranged in an annular pattern, a formation as shown in FIG. 5 (however, no coils 3 are shown in FIG. 5) is achieved. As shown in FIG. 6, the stator 20 further includes the mold resin portion 5 coating, with a mold resin, the division coil-wound bodies 1 arranged as shown in FIG. 5. The mold resin portion 5 is formed from, for example, a thermosetting resin such as a bulk molding compound (BMC).

The stator 20 excluding the protrusion surfaces 21A and 22A of the protrusions 21 and 22 of the insulator 2 disposed on each of the division coil-wound bodies 1 and the distal-end surface 11D of the division core piece 11 is coated with the mold resin portion 5. That is, the protrusion surfaces 21A and 22A are exposed from the mold resin portion 5 and are not coated with the mold resin portion 5. This configuration will be described in detail in relation to a method for manufacturing the stator 20.

As shown in FIG. 7 and FIG. 27, the rotary electrical machine 100 includes: the stator 20; a rotor 40 rotatably disposed on the inner side X2 in the radial direction X of the stator 20 and including a rotation shaft 41 and bearings 42; and a bracket 7 which is disposed in an opening 200 (see FIG. 6) at one end in the axial direction Y of the stator 20 and which holds either of the bearings 42 holding the rotation shaft 41 of the rotor 40. In this embodiment 1, an example has been described in which the bracket 7 is disposed at the one end in the axial direction Y. However, without limitation thereto, a case in which the opening 200 is provided at each of both ends in the axial direction Y of the stator 20 and the bracket 7 is disposed at each of said both ends in the axial direction Y, is also conceivable.

Next, a method for manufacturing the stator 20 according to embodiment 1 configured as described above and the rotary electrical machine 100 in which the stator 20 is used, will be described with reference to FIG. 12. First, an assembling step is performed in which the insulator 2 molded in advance is mounted on the division core piece 11 formed by stacking electromagnetic steel sheets in the axial direction Y, or the insulator 2 is molded to be integrated with said division core piece 11 (step ST1 in FIG. 12). Next, a winding step is performed in which a conductive wire is wound around the tooth portion 112 of the division core piece 11 with the insulator 2 therebetween to form the coil 3, thereby forming the division coil-wound body 1 shown in FIG. 1 (step ST2 in FIG. 12).

Next, an in-mold disposition step is performed in which a plurality of the division coil-wound bodies 1 are arranged in a molding mold 50 (see FIG. H described later) in an annular pattern around a center axis of the stator 20 as shown in FIG. 5 (step ST3 in FIG. 12). Next, a molding step is performed in which the mold resin portion 5 is formed from a mold resin (step ST4 in FIG. 12). Consequently, the stator 20 shown in FIG. 6 is formed. In this stator 20, the protrusion surfaces 21A and 22A of the insulator 2 are exposed from the mold resin and are not coated with the mold resin. The molding mold 50 used in the in-mold disposition step and the molding step, an arrangement relationship between the molding mold 50 and the division coil-wound body 1, and details of the steps for achieving the above formation, will be described.

Firstly, a configuration of the molding mold 50 used in the molding step will be described with reference to FIG. 8. The molding mold 50 is configured to include a movable mold 51 and a fixed mold 52 which are opened/closed at a particle surface 55 and between which a cavity 53 is formed. The fixed mold 52 has a columnar center shaft 54 formed to protrude into the cavity 53. The outer diameter of the center shaft 54 is equal to the inner diameter of the stator 20. The movable mold 51 has a mold inner circumferential surface 51A having a slope relative to a center axis of the center shaft 54 such that the opening area (opening diameter) increases toward the fixed mold 52.

Before the molding step, the movable mold 51 is moved in a direction opposite to a direction toward the fixed mold 52 so as to perform mold opening as shown in FIG. 8, and the plurality of division coil-wound bodies 1 are arranged in the cavity 53 around the center axis of the stator 20 in an annular pattern as shown in FIG. 5. Details of the state where the division coil-wound bodies 1 are arranged in the molding mold 50 in this manner will be described with reference to FIG. 9 and FIG. 10. FIG. 9 shows the relationship between the molding mold 50 and the upper side (on the drawing sheet) in the axial direction Y of the division coil-wound body 1 shown in FIG. 4. FIG. 10 shows the relationship between the molding mold 50 and the lower side ion the drawing sheet) in the axial direction Y of the division coil-wound body 1 shown in FIG. 4.

As shown in FIG. 9 and FIG. 10, the protrusion surface 21A of the protrusion 21 on one end side in the axial direction Y and the protrusion surface 22A of the protrusion 22 on another end side in the axial direction Y are formed such that slopes of the protrusion surfaces 21A and 22A relative to the axial direction Y are equal to each other (with a slope angle of 0 degrees being excluded). Furthermore, the protrusion surfaces 21A and 22A of the respective protrusions 21 and 22 of the insulator 2 of the division coil-wound body 1, and the mold inner circumferential surface 51A of the movable mold 51, are formed such that orientations of the slopes of the protrusion surfaces 21A and 22A relative to the axial direction Y and an orientation of a slope of the mold inner circumferential surface 51A relative to the axial direction Y are the same as each other. That is, the protrusion surfaces 21A and 22A and the mold inner circumferential surface 51A are parallel to each other. In actuality, the slope angle of each of the slopes relative to the axial direction Y merely has a value smaller than 10°. Thus, in actuality, distinguishment from surfaces parallel to the axial direction Y is difficult as shown in FIG. 4. Considering this, in FIG. 9 and FIG. 10, the relationship between the slope of each of the protrusion surfaces 21A and 22A of the protrusions 21 and 22 relative to the axial direction Y and the slope of the mold inner circumferential surface 51A of the molding mold 50 relative to the axial direction Y is shown in an exaggerated manner.

Then, for mold closing, the movable mold 51 is moved toward the fixed mold 52 so as to close the molding mold 50. Regarding this closing, an “interference” is set for the movable mold 51 and the fixed mold 52, and, before achievement of the mold closing and during movement of the movable mold 51, the mold inner circumferential surface 51A of the movable mold 51 is first brought into contact with the protrusion surfaces 21A and 22A of the insulator 2 protruding to the outer side X1 in the radial direction X.

Since the mold inner circumferential surface 51A of the movable mold 51 and the protrusion surfaces 21A and 22A of the protrusions 21 and 22 of the insulator 2 have slopes, when the movable mold 51 is continuously moved without stopping to achieve mold closing, mold locking force as a load applied in the axial direction Y during movement of the movable mold 51 is converted into a load applied in the radial direction X to the division coil-wound body 1. Consequently, owing to elastic forces of the protrusions 21 and 22, the division coil-wound body 1 is pressed from the outer side X1 to the inner side X2 in the radial direction X, whereby the distal-end surface 11D of the tooth portion 112 is pressed against the center shaft 54.

Figure 13:
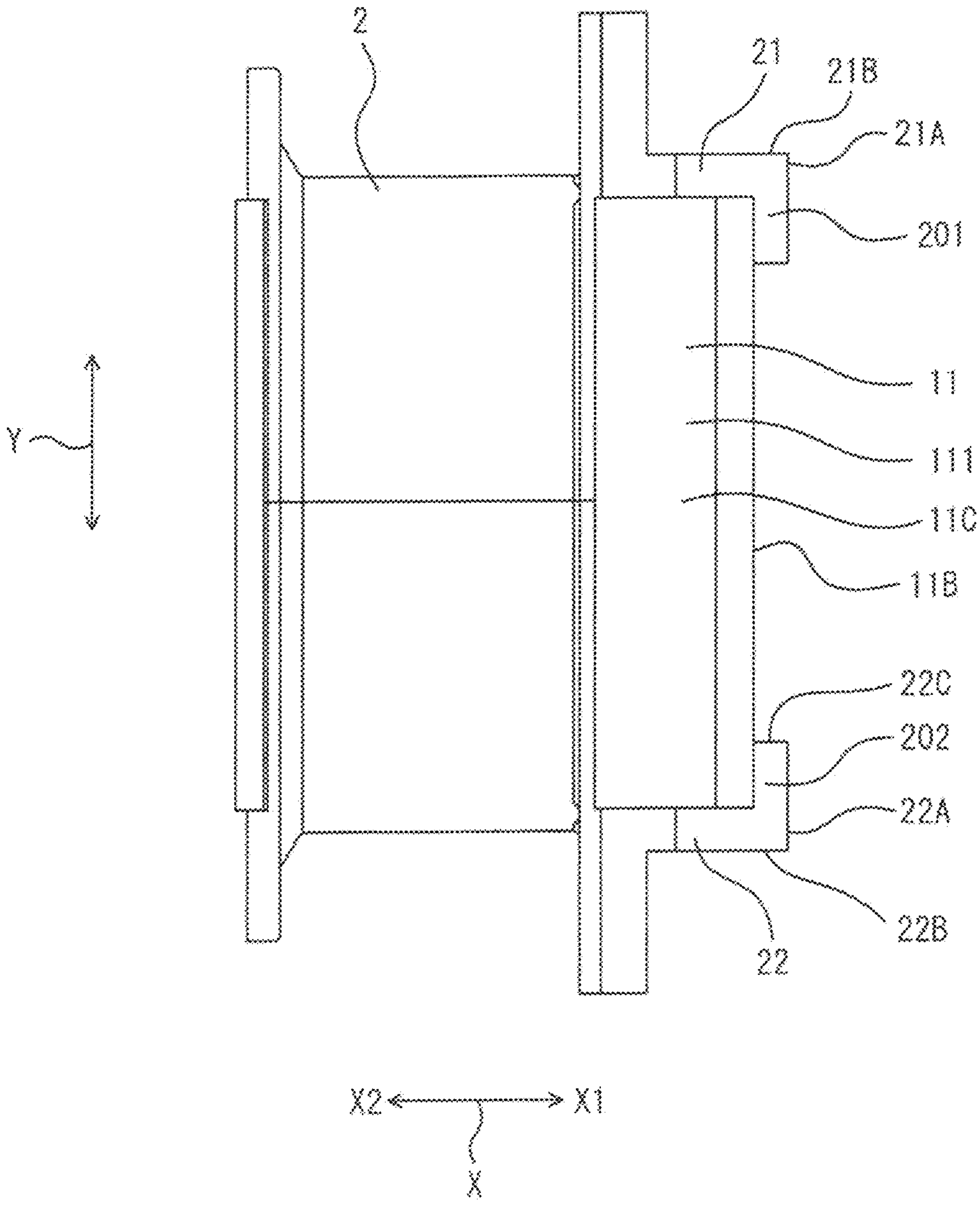
FIG. 13 is a side view showing a configuration in which an insulator is disposed on the division core piece, in embodiment 2.

Specific description thereof is as follows. That is, a state is obtained where, as shown in FIG. 13, a value obtained by multiplying, by a friction coefficient μN generated between the protrusion surface 21A, 22A of the protrusion 21, 22 and the mold inner circumferential surface 51A, a load N generated in a direction toward the outer side X1 in the radial direction X of the protrusion 21, 22 owing to the "interference" between the protrusion 21, 22 and the mold inner circumferential surface 51A is larger than a load F received in the circumferential direction Z by the protrusion 21, 22 owing to a resin pressure.

In this manner, the protrusion surfaces 21A and 22A of the protrusions 21 and 22 are desirably formed to be at the same angle as the slope of the mold inner circumferential surface 51A relative to the axial direction Y at the time of mold closing such that the division coil-wound body 1 can be pressed, at the protrusion surfaces 21A and 22A, from the outer side X1 to the inner side X2 in the radial direction X evenly in the axial direction Y.

The protrusion surfaces 21A and 22A of the protrusions 21 and 22 are formed to establish the following dimensional relationship. That is, when the division coil-wound body 1 is disposed in the molding mold 50 and mold closing is performed, the mold inner circumferential surface 51A is brought into contact with the protrusion surfaces 21A and 22A, and, owing to the elastic forces of the protrusions 21 and 22, the insulator 2 presses the division core piece 11 from the outer side X1 to the inner side X2 in the radial direction X so as to press the distal-end surface 11D of the tooth portion 112 against the center shaft 54, whereby the division coil-wound body 1 does not move owing to a resin pressure during pouring of a mold resin.

The protrusions 21 and 22 are not limited to those in this example and only have to be such that, when the division coil-wound body 1 is disposed in the molding mold 50 and mold closing is performed, the mold inner circumferential surface 51A is brought into contact with the protrusions 21 and 22, and, owing to elastic forces, the insulator 2 presses the distal-end surface 110 of the tooth portion 112 against the center shaft 54 from the outer side X1 to the inner side X2 in the radial direction X, whereby the division coil-wound body 1 does not move owing to a resin pressure even during pouring of a mold resin. As long as this requirement is satisfied, the widths in the circumferential direction Z of the protrusion surfaces 21A, 22A of the protrusions 21, 22, and the number of the protrusion surfaces 21A, 22A of the protrusions 21, 22 formed in the circumferential direction Z, may be such that a plurality of such protrusion surfaces are, instead of one such protrusion surface, disposed for one division coil-wound body 1.

In this state, melted mold resin is poured into the cavity 53, to coat the division coil-wound body 1. After the mold resin is poured into the cavity 53, the molding mold 50 is heated. Consequently, the mold resin in the cavity 53 is cured, whereby the stator 20 shown in FIG. 6 is formed. After the mold resin is cured to form the mold resin portion 5, the movable mold 51 is moved in the direction opposite to the direction toward the fixed mold 52 so as to perform mold opening, and the stator 20 is taken out from the molding mold 50. In the stator 20 having been thus formed, since the mold resin portion 5 has been formed in a state where the protrusion surfaces 21A and 22A of the insulator 2 are in close contact with the mold inner circumferential surface 51A, the protrusion surfaces 21A and 22A of the insulator 2 are exposed from the mold resin and are not coated with the mold resin.

Next, the rotary electrical machine 100 is manufactured by using the stator 20 manufactured as described above. First, a disposition step is performed in which the rotor 40 is inserted from the opening 200 of the stator 20 and disposed to face the distal-end surface 11D of the tooth portion 112 (step ST5 in FIG. 12). Next, an attaching step is performed in which the bracket 7 which holds the bearing 42 holding the rotation shaft 41 of the rotor 40 is attached into the opening 200 of the stator 20 (step ST6 in FIG. 12). Consequently, manufacturing of the rotary electrical machine 100 is completed.

The stator according to embodiment 1 configured as described above is a stator including:

a core having
- a core-back portion formed in an annular shape and
- a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and a mold resin portion coating the core and the coil, wherein the core-back portion is formed to be discontinuous at at least one position in the circumferential direction, the insulator has, at each of two or more positions in the circumferential direction, a protrusion protruding to an outer side in the radial direction beyond an outer circumferential surface of the core-back portion, and the mold resin portion does not coat a protrusion surface which is located on the outer side in the racial direction of the protrusion and which extends along an axial direction.

Also, the rotary electrical machine according to embodiment 1 configured as described above is a rotary electrical machine including:

the above stator;

a rotor rotatably and coaxially disposed on the inner side in the radial direction of the stator; and a bracket which is disposed on at least one end in the axial direction of the stator and which holds a bearing holding a rotation shaft of the rotor.

Also, the method for manufacturing the stator according to embodiment 1 performed as described above is a method including steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion; and a molding step of performing coating with a mold resin such that the protrusion surface of the protrusion is exposed, to form the stator.

Also, the method for manufacturing the rotary electrical machine according to embodiment 1 performed as described above is a method including steps to be sequentially performed, the steps being:

a disposition step of disposing a rotatable and coaxial rotor on the inner side in the radial direction of the stator formed through the above method for manufacturing the stator; and an attaching step of attaching, to at least one end in the axial direction of the stator, a bracket which holds a bearing holding a rotation shaft of the rotor.

Consequently, it is possible to provide a stator, a rotary electrical machine, a method for manufacturing a stator, and a method for manufacturing a rotary electrical machine in which favorable roundness is imparted without increasing machining cost, equipment cost, or the number of components.

Furthermore, in the stator according to embodiment 1 configured as described above, the protrusion is formed such that a value obtained by multiplying, by a friction coefficient generated between the protrusion surface of the protrusion and a mold inner circumferential surface for forming the mold resin portion, a load generated in a direction toward the outer side in the radial direction of the protrusion with respect to the mold inner circumferential surface for forming the mold resin portion becomes larger than a load received in the circumferential direction by the protrusion owing to a resin pressure during pouring of a mold resin for the mold resin portion.

Consequently, a stator having a further favorable roundness can be obtained.

Furthermore, in the stator according to embodiment 1 configured as described above, the protrusion is formed on each of both end sides in the axial direction of the core-back portion, and a slope of the protrusion surface of the protrusion on one end side in the axial direction relative to the axial direction and a slope of the protrusion surface of the protrusion on another end side in the axial direction relative to the axial direction are equal to each other (with a slope angle of 0 degrees being excluded).

Consequently, a stator having a favorable roundness can be easily obtained.

Furthermore, in the stator according to embodiment 1 configured as described above, the protrusion is formed on each of both end sides in the axial direction of the core-back portion.

Consequently, a stator having a further favorable roundness can be obtained.

Embodiment 2

Figure 14:
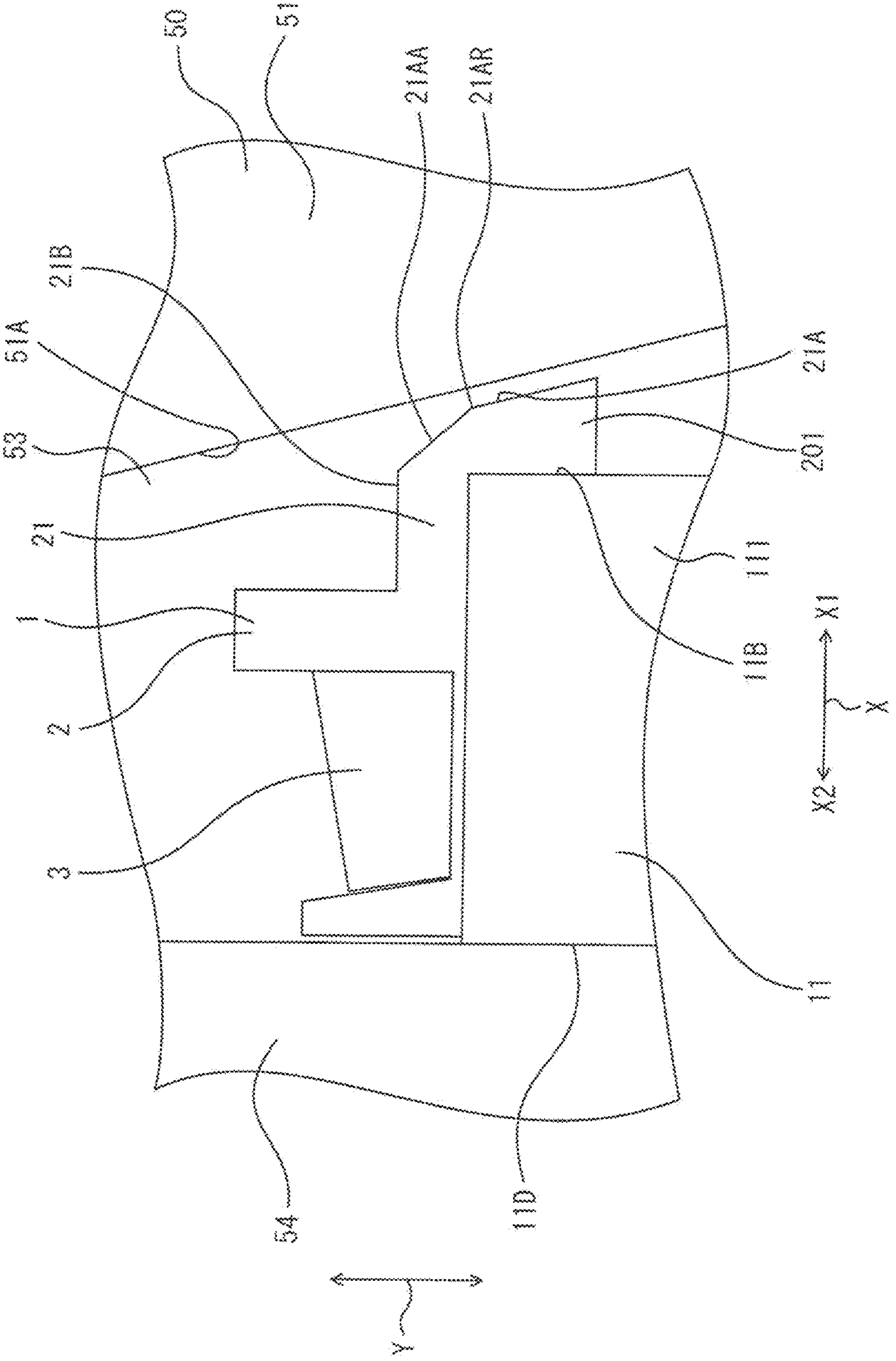
FIG. 14 is an enlarged schematic view showing an arrangement relationship between the molding mold shown in FIG. 8 and the upper side (on the drawing sheet) in the axial direction of the division coil-wound body shown in FIG. 13.
Figure 15:
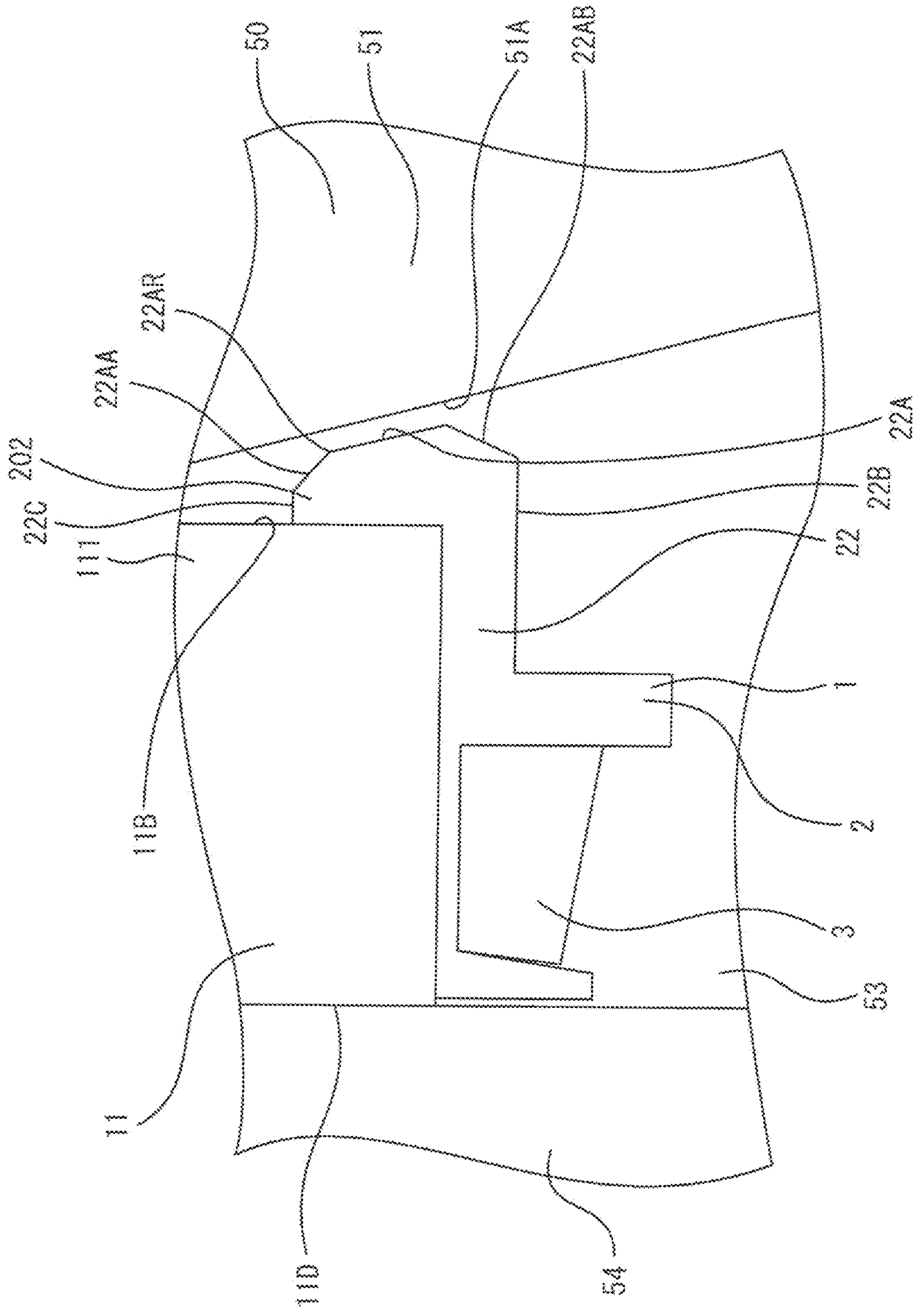
FIG. 15 is an enlarged schematic view showing an arrangement relationship between the molding mold shown in FIG. 8 and the lower side (on the drawing sheet) in the axial direction of the division coil-wound body shown in FIG. 13.
Figure 16:
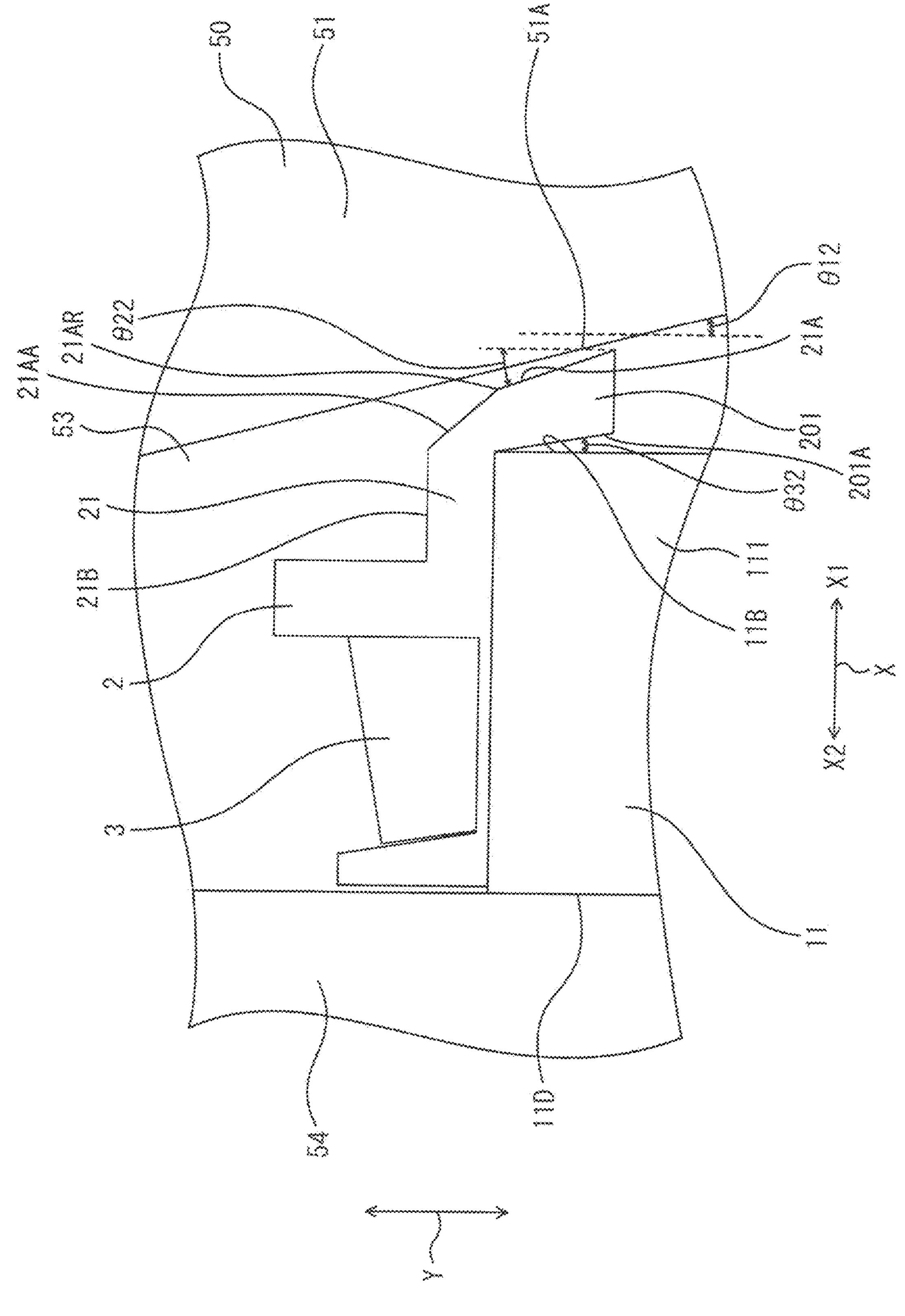
FIG. 16 is an enlarged schematic view showing the upper side (on the drawing sheet) in the axial direction regarding an arrangement relationship between a modification of the division coil-wound body shown in FIG. 13 and the molding mold shown in FIG. 6.
Figure 17:
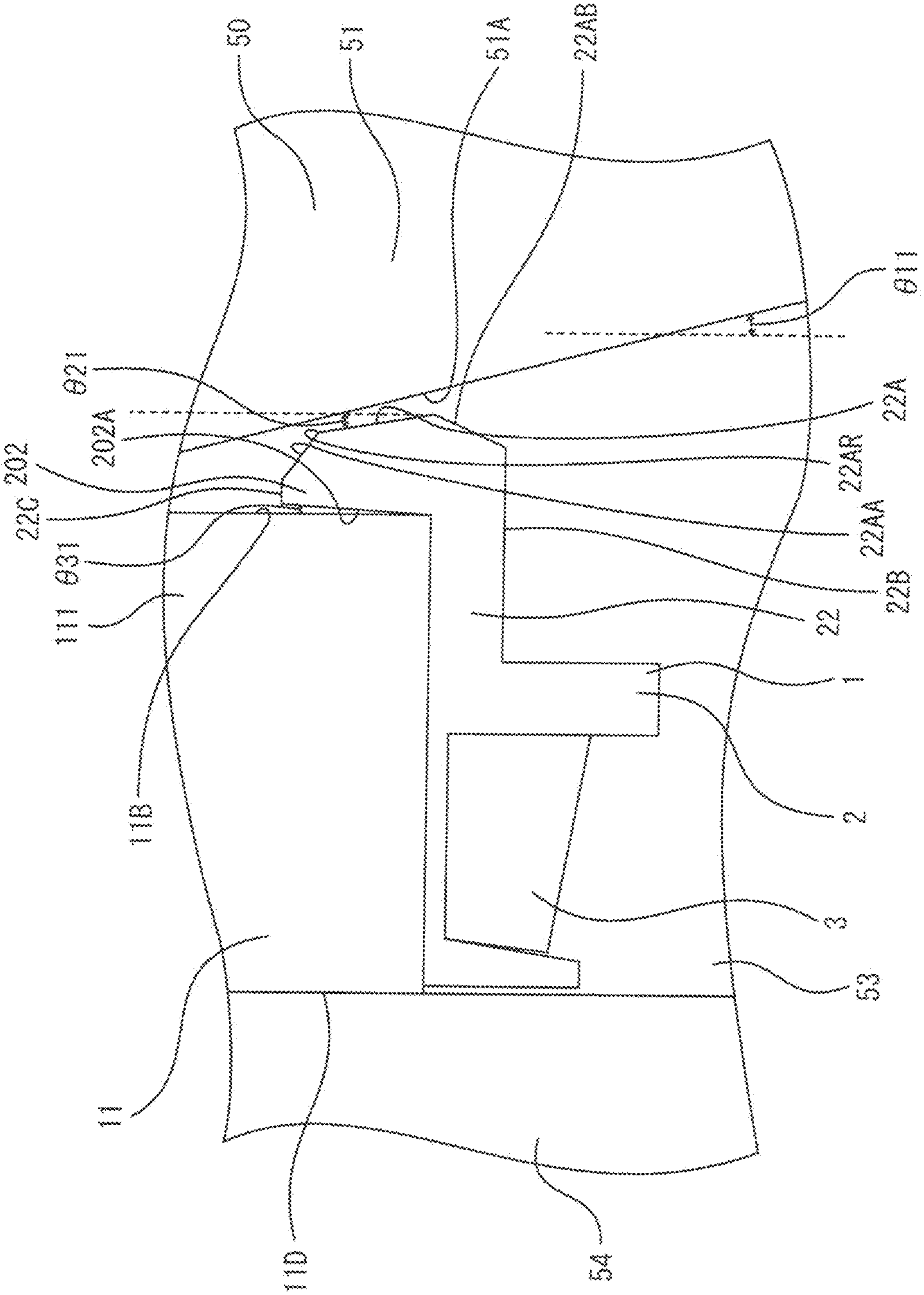
FIG. 17 is an enlarged schematic view showing the lower side (on the drawing sheet; in the axial direction regarding an arrangement relationship between a modification of the division coil-wound body shown in FIG. 13 and the molding mold shown in FIG. 8.

FIG. 13 is a side view showing a configuration in which an insulator is disposed on the division core piece, in embodiment 2. FIG. 14 is an enlarged schematic view showing the upper side (on the drawing sheet) in the axial direction regarding an arrangement relationship between the division coil-wound body shown in FIG. 13 and the molding mold shown in FIG. 8. FIG. 15 is an enlarged schematic view showing the lower side (on the drawing sheet) in the axial direction regarding an arrangement relationship between the division coil-wound body shown in FIG. 13 and the molding mold shown in FIG. 8. FIG. 16 is an enlarged schematic view showing the upper side (on the drawing sheet) in the axial direction regarding an arrangement relationship between a modification of the division coil-wound body shown in FIG. 13 and the molding mold shown in FIG. 8. FIG. 17 is an enlarged schematic view showing the lower side (on the drawing sheet) in the axial direction regarding an arrangement relationship between a modification of the division coil-wound body shown in FIG. 13 and the molding mold shown in FIG. 8.

The same portions as those in the above embodiment 1 in the drawings are denoted by the same reference characters, and description thereof is omitted. In actuality, the slope angle of each of the slopes shown in FIG. 14 to FIG. 16 relative to the axial direction Y merely has a value smaller than 10°. Thus, in actuality, distinguishment from surfaces parallel to the axial direction Y is difficult as shown in FIG. 13. Considering this, in FIG. 14 to FIG. 16, the relationship between the slope of each of the protrusion surfaces 21A and 22A and extension portions 201 and 202 of the protrusions 21 and 22 relative to the axial direction Y and the slope of the mold inner circumferential surface 51A of the molding mold 50 relative to the axial direction Y is shown in an exaggerated manner.

In the present embodiment 2, the protrusions 21 and 22 protrude to the outer side X1 beyond the outer circumferential surface 11B of the core-back portion 111, and furthermore, have the extension portions 201 and 202 extending toward the center side in the axial direction Y of the division core piece 11 along the outer circumferential surface 11B of the division core piece 11. Since the extension portions 201 and 202 are provided, a higher rigidity can be obtained than in the insulator 2 in the above embodiment 1.

Similar to the above embodiment 1, the protrusion surfaces 21A and 22A of the protrusions 21 and 22 are such that, when the division coil-wound body 1 is disposed in the molding mold 50 and mold closing is performed, the outer circumferential surface 11B of the core-back portion 111 and the mold inner circumferential surface 51A are in contact with the protrusions 21 and 22, and, owing to elastic forces, the division coil-wound body 1 is pressed from the outer side X1 to the inner side X2 in the radial direction X so as to press the distal-end surface 11D of the tooth portion 112 against the center shaft 54. Thus, such a dimensional relationship that the division coil-wound body 1 does not move owing to a resin pressure even during pouring of a mold resin, is established.

For example, as shown in FIG. 14 and FIG. 15, in a case where the extension portions 201 and 202 are formed along the outer circumferential surface 11B of the core-back portion 111, each of the protrusion surfaces 21A and 22A and the mold inner circumferential surface 51A are formed such that the slope angle of the protrusion surface 21A, 22A relative to the axial direction Y and the slope angle of the mold inner circumferential surface 51A relative to the axial direction Y are equal to each other.

On the other hand, as shown in FIG. 16, in a case where the extension portion 201 is formed to be away from the outer circumferential surface 11B of the core-back portion 111, and an orientation of a slope of a facing surface 201A, of the extension portion 201, facing the core-back portion 111 relative to the axial direction Y and the orientation of the slope of the mold inner circumferential surface 51A relative to the axial direction Y are the same as each other, the protrusion surface 21A of the protrusion 21 is formed such that a slope angle θ22 of the protrusion surface 21A relative to the axial direction Y is an angle obtained by adding a slope angle θ32 formed between the facing surface 201A of the extension portion 201 of the protrusion 21 and the outer circumferential surface 11B of the core-back portion 111 to a slope angle θ12 of the mold inner circumferential surface 51A relative to the axial direction Y.

Meanwhile, as shown in FIG. 17, in a case where the extension portion 202 is formed to be away from the outer circumferential surface 11B of the core-back portion 111, and an orientation of a slope of a facing surface 202A, of the extension portion 202, facing the core-back portion 111 relative to the axial direction Y and the orientation of the slope of the mold inner circumferential surface 51A relative to the axial direction Y differ from each other, the protrusion surface 22A of the protrusion 22 is formed such that a slope angle θ21 of the protrusion surface 22A relative to the axial direction Y is an angle obtained by subtracting a slope angle 431 formed between the facing surface 202A of the extension portion 202 of the protrusion 22 and the outer circumferential surface 11B of the core-back portion 111 from a slope angle θ11 of the mold inner circumferential surface 51A relative to the axial direction Y.

As shown in FIG. 14 and FIG. 16, in the case of the protrusion 21 on the upper side on the drawing sheet, the protrusion 21 is formed such that: a slope angle of a partial surface 21AA of the protrusion surface 21A of the protrusion 21 relative to the axial direction Y is set to be larger than the slope angle of the mold inner circumferential surface 51A relative to the axial direction Y; and a corner 21AR is rounded. Consequently, damage such as fracture and buckling of the protrusion 21 due to mold closing can be prevented.

Specifics thereof are as follows. That is, during movement of the movable mold 51 toward the fixed mold 52 for mold closing, the particle surface 55 of the movable mold 51 as a division surface between the fixed mold 52 and the movable mold 51 might interfere with the axial-end surface 21B of the protrusion 21, and a load might be applied to the extension portion 201 in the axial direction Y instead of the radial direction X so as to generate a shear stress, resulting in fracture, but this fracture can be prevented by decreasing the area of the axial-end surface 21B as a result of adding the partial surface 21AA and the corner 21AF to the protrusion surface 21A. Moreover, owing to said addition, buckling can be prevented from occurring through generation of a load in the radial direction X also with respect to a portion other than the extension port-on 201 of the protrusion 21 after mold closing.

As shown in FIG. 15 and FIG. 17, in the case of the protrusion 22 on the lower side on the drawing sheet, a slope angle of a partial surface 22AA of the protrusion 22 relative to the axial direction Y is set to be larger than the slope angle of the mold inner circumferential surface 51A relative to the axial direction Y, a corner 22AR is rounded, and furthermore, an orientation of a slope of a partial surface 22AB of the protrusion surface 22A of the protrusion 22 relative to the axial direction Y is set to be opposite to the orientation of the slope of the mold inner circumferential surface 51A relative to the axial direction Y. Consequently, damage such as fracture and buckling of the protrusion 22 due to mold closing can be prevented.

Specifics thereof are as follows. That is, during movement of the movable mold 51 toward the fixed mold 52 for mold closing, the particle surface 55 of the movable mold 51 as a division surface between the fixed mold 52 and the movable mold 51 might interfere with an extension distal-end surface 22C of the protrusion 22, and a load might be applied to the extension portion 202 in the axial direction Y instead of the radial direction X so as to generate a shear stress, resulting in fracture, but this fracture can be prevented by decreasing the area of the extension distal-end surface 22C as a result of adding the partial surface 22AA and the corner 22AR to the protrusion surface 22A. Moreover, owing to said addition, buckling can be prevented from occurring through generation of a load in the radial direction X also with respect to a portion other than the extension portion 202 of the protrusion 22 after mold closing.

As shown in FIG. 16 and FIG. 17, the facing surfaces 201A and 202A of the extension portions 201 and 202 of the protrusions 21 and 22 have slopes relative to the axial direction Y so as to be away from the outer circumferential surface 11B of the core-back portion 111. Consequently, in a case where the insulator 2 molded in advance is mounted on each of the division core pieces 11, the division core piece 11 and the insulator 2 can be fitted even when there is a variation in dimension among the division core pieces 11.

When the division coil-wound body 1 is disposed in the molding mold 50 and mold closing is performed, both the outer circumferential surface 11B of the core-back portion 111 and the mold inner circumferential surface 51A are in contact with the protrusions 21 and 22, and, owing to elastic forces, the division coil-wound body 1 is pressed from the outer side X1 to the inner side X2 in the radial direction X so as to press the distal-end surface 11D of the tooth portion 112 against the center shaft 54, whereby the division coil-wound body 1 does not move owing to a resin pressure even during pouring of a mold resin. As long as this requirement is satisfied, the widths in the circumferential direction Z of the protrusion surfaces 21A, 22A of the protrusions 21, 22, and the number of the protrusion surfaces 21A, 22A of the protrusions 21, 22 formed in the circumferential direction Z, may be such that a plurality of such protrusion surfaces are, instead of one such protrusion surface, disposed for one division coil-wound body 2. Subsequently, the rotary electrical machine 100 can be configured by using this stator 20 in the same manner as in the above embodiment 1.

The stator according to embodiment 2 configured as described above exhibits the same advantageous effects as those in the above embodiment 1.

Moreover, the protrusion has an extension portion formed along the outer circumferential surface on the outer side in the radial direction of the core-back portion of the core so as to extend to a center side in the axial direction.

Consequently, a stator having a high rigidity and a further favorable roundness can be obtained.

Furthermore, in the stator according to embodiment 2 configured as described above,

- the extension portion is formed along the outer circumferential surface of the core-back portion, and
- the protrusion surface of the protrusion is formed such that an orientation of a slope of the protrusion surface relative to the axial direction is the same as an orientation of a slope of a mold inner circumferential surface for forming the mold resin portion relative to the axial direction.

Consequently, a stator having a further favorable roundness can be obtained.

Furthermore, in the stator according to embodiment 2 configured as described above,

- the extension portion is formed to be away from the outer circumferential surface of the core-back portion,
- in a case where an orientation of a slope of a facing surface, of the extension portion, facing the core-back portion relative to the axial direction is the same as an orientation of a slope of a mold inner circumferential surface for forming the mold resin portion relative to the axial direction, the protrusion surface has, as a slope angle, an angle obtained by adding an angle formed between the extension portion and the outer circumferential surface of the core-back portion to a slope angle of the mold inner circumferential surface for forming the mold resin portion, and, in a case where the orientation of the slope of the facing surface, of the extension portion, facing the core-back portion relative to the axial direction differs from the orientation of the slope of the mold inner circumferential surface for forming the mold resin portion relative to the axial direction, the protrusion surface has, as a slope angle, an angle obtained by subtracting the angle formed between the extension portion and the outer circumferential surface of the core-back portion from the slope angle of the mold inner circumferential surface for forming the mold resin portion.

Consequently, in a case where the insulator molded in advance is mounted on the core, the core and the insulator can be fitted even when there is a variation in the dimension of the core.

Embodiment 3

Figure 28:
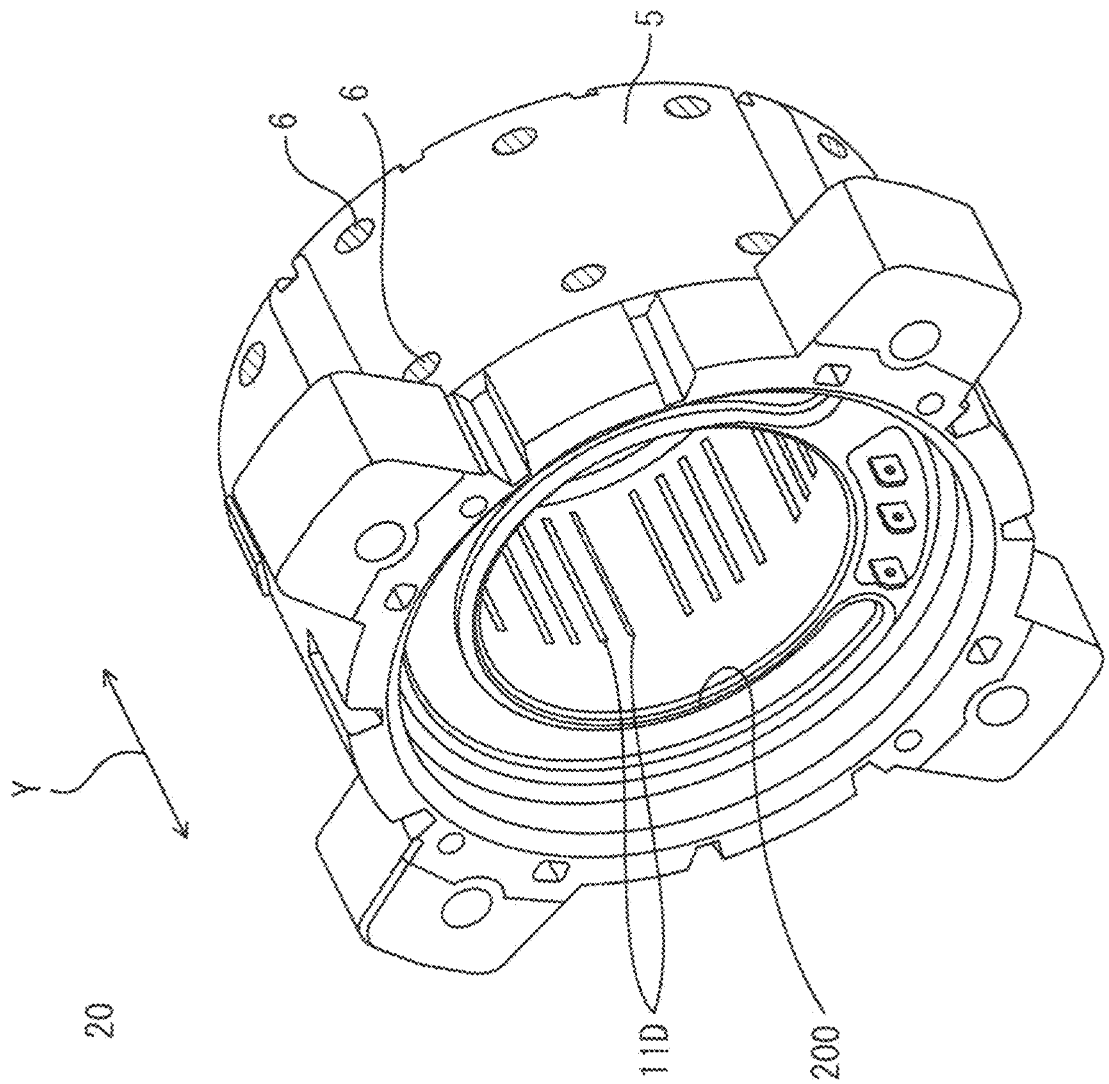
FIG. 28 is a perspective view showing a configuration of a stator according to embodiment 3.
Figure 29:
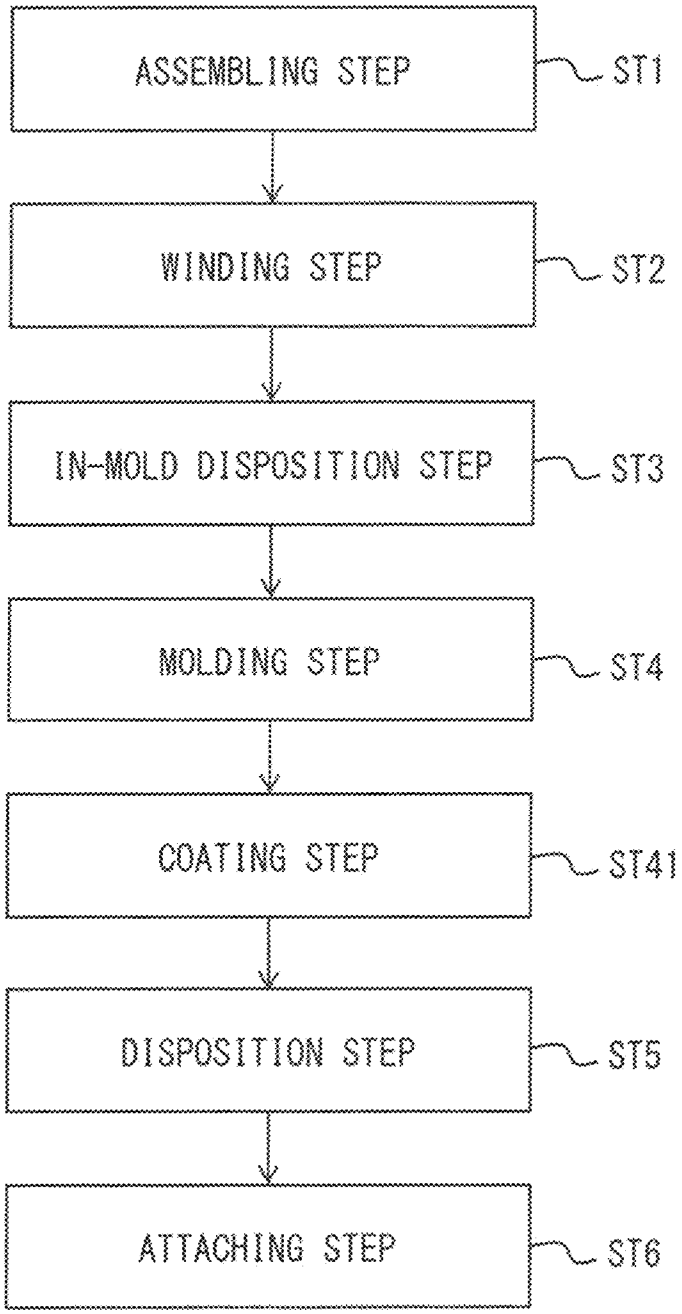
FIG. 29 is a flowchart showing a process for manufacturing a rotary electrical machine according to embodiment 3.

FIG. 28 is a perspective view showing a configuration of a stator according to embodiment 3. FIG. 29 is a flowchart showing a method for manufacturing a rotary electrical machine according to embodiment 3. In the drawings, the same portions as those in the above embodiments are denoted by the same reference characters, and description thereof is omitted.

In the present embodiment 3, the protrusion surfaces 21A and 22A which extend along the axial direction Y and are located on the outer sides X1 in the radial direction X of the protrusions 21 and 22 of the insulator 2 and which are not coated with the mold resin portion 5 in FIG. 6 described in the above embodiment 1, are coated with first members 6 as shown in FIG. 28. Each of the first members 6 is made from a material different from a material of the mold resin portion 5, and examples of the material of the first member 6 include adhesives, tapes, and the like.

A method for manufacturing the stator according to embodiment 3 configured as described above and the rotary electrical machine in which the stator is used, will be described with reference to FIG. 29. First, a process from the assembling step to the molding step (from step ST1 to step ST4 in FIG. 29) is performed in the same manner as in the above embodiment 1. Next, a coating step (step ST41 in FIG. 29) is performed in which the protrusion surfaces 21A and 22A which extend along the axial direction Y and are located on the outer side X1 in the radial direction X of the protrusions 21 and 22 of the insulator 2 and which are not coated with the mold resin portion 5, are coated with the first members 6. Subsequently, the same steps as those in the above embodiment 1 are performed to complete the manufacturing of the rotary electrical machine 100.

The stator according to embodiment 3 configured as described above exhibits the same advantageous effects as those in the above embodiments.

Moreover, the protrusion surface which is not coated with the mold resin portion is coated with a first member made from a material different from a material of the mold resin portion.

Consequently, the insulator can be prevented from being exposed, whereby water entry from the boundary between the insulator and the mold resin portion can be prevented.

Also, the method for manufacturing the stator according to embodiment 3 performed as described above is a method including steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion;

a molding step of performing coating with a mold resin such that the protrusion surface of the protrusion is exposed, to form the stator; and a coating step of coating the protrusion surface of the protrusion with the first member, the protrusion surface not being coated with the mold resin portion.

Consequently, the insulator can be prevented from being exposed, whereby water entry from the boundary between the insulator and the mold resin portion can be prevented.

Embodiment 4

Figure 30:
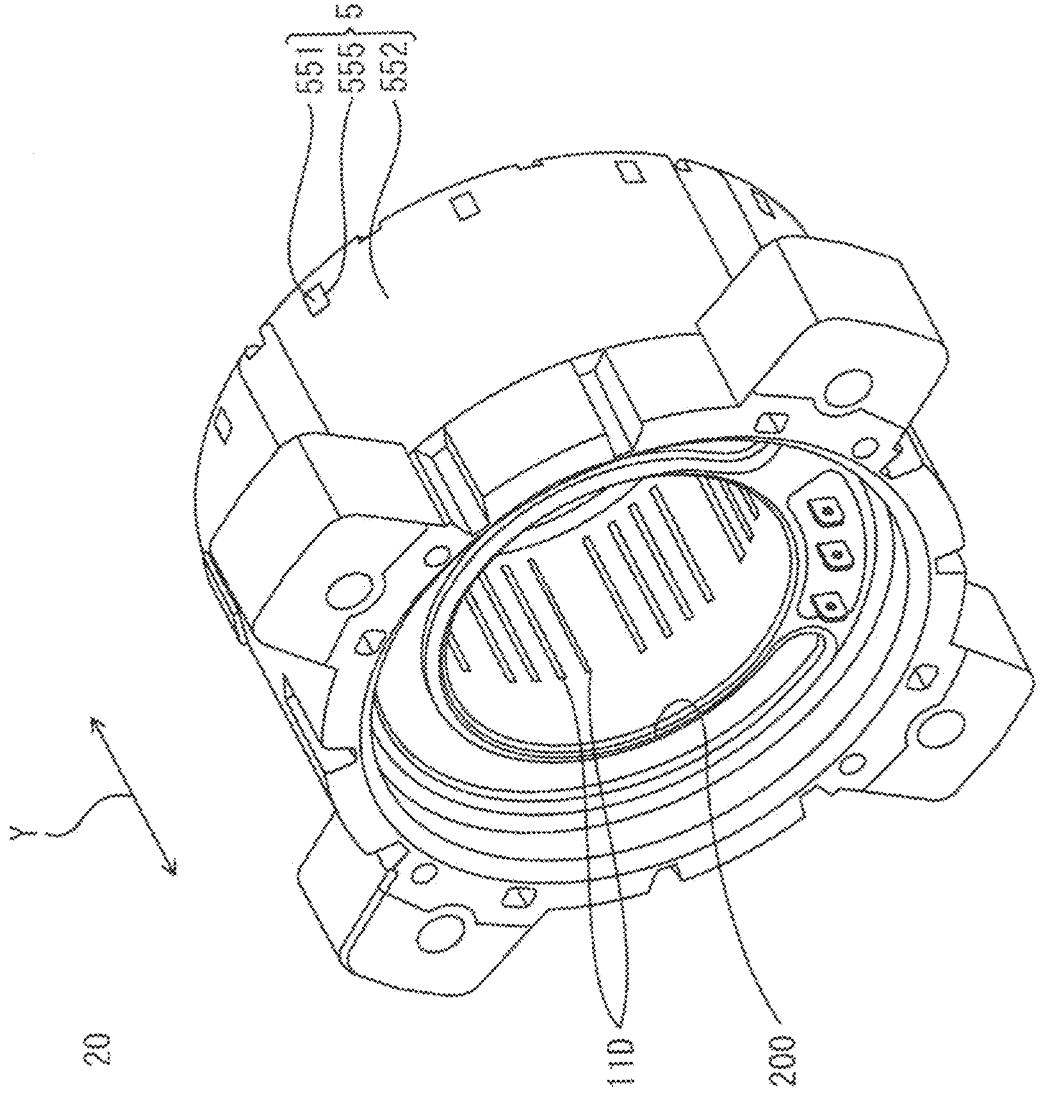
FIG. 30 is a perspective view showing a configuration of a stator according to embodiment 4.
Figure 31:
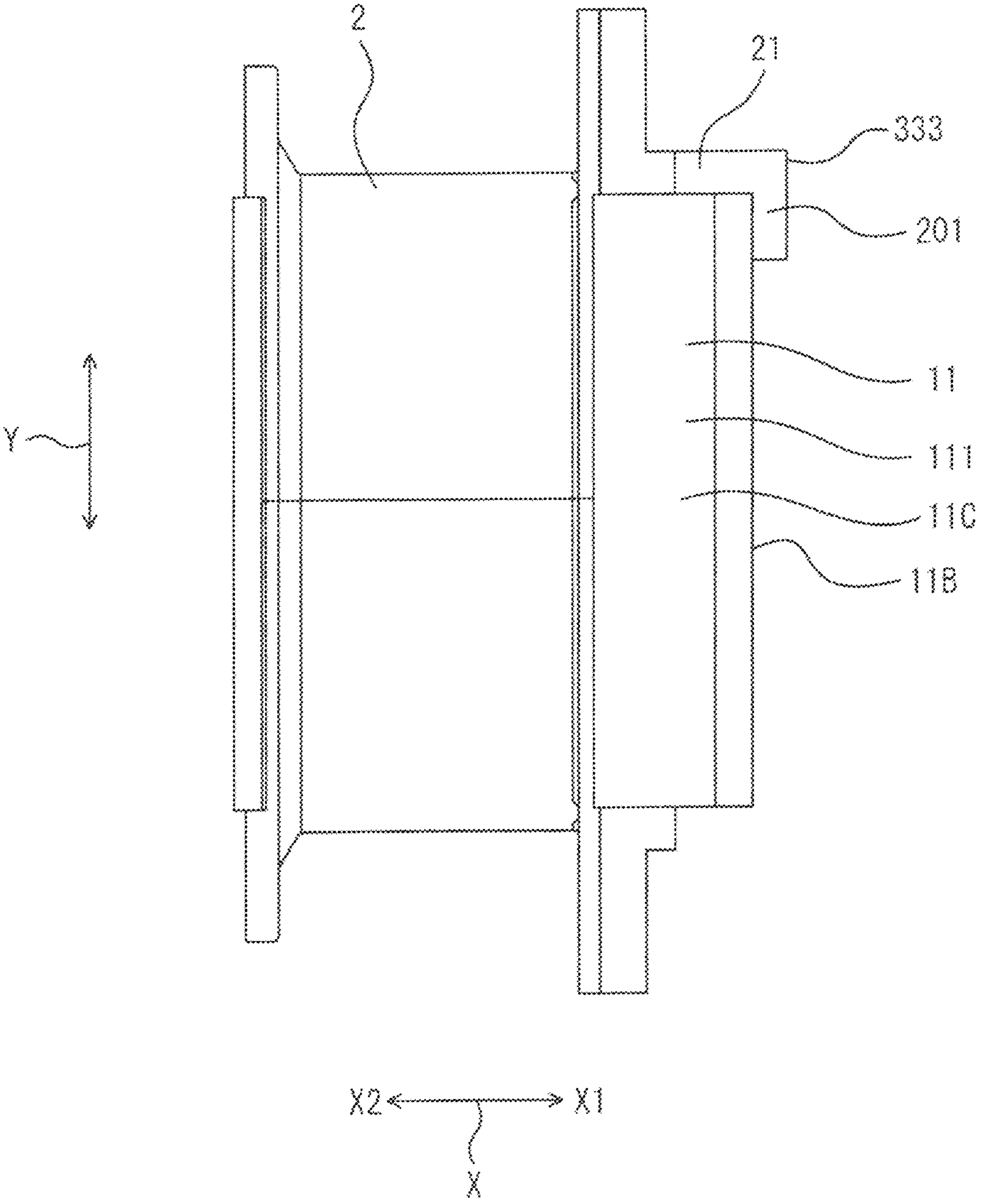
FIG. 31 is a side view showing a configuration in which an insulator is disposed on the division core piece, in embodiment 4.
Figure 32:
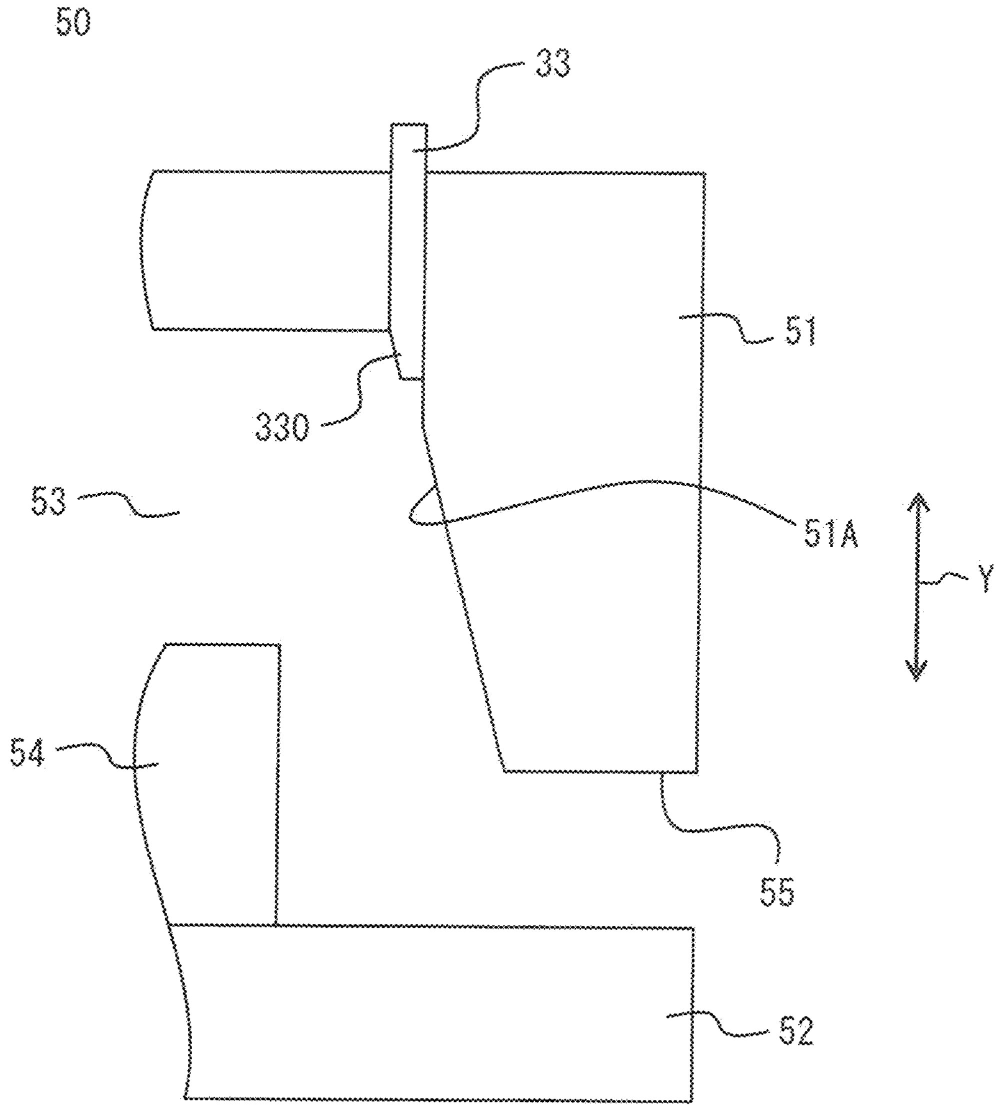
FIG. 32 is a schematic cross-sectional view showing a configuration of a molding mold in embodiment 4.
Figure 33:
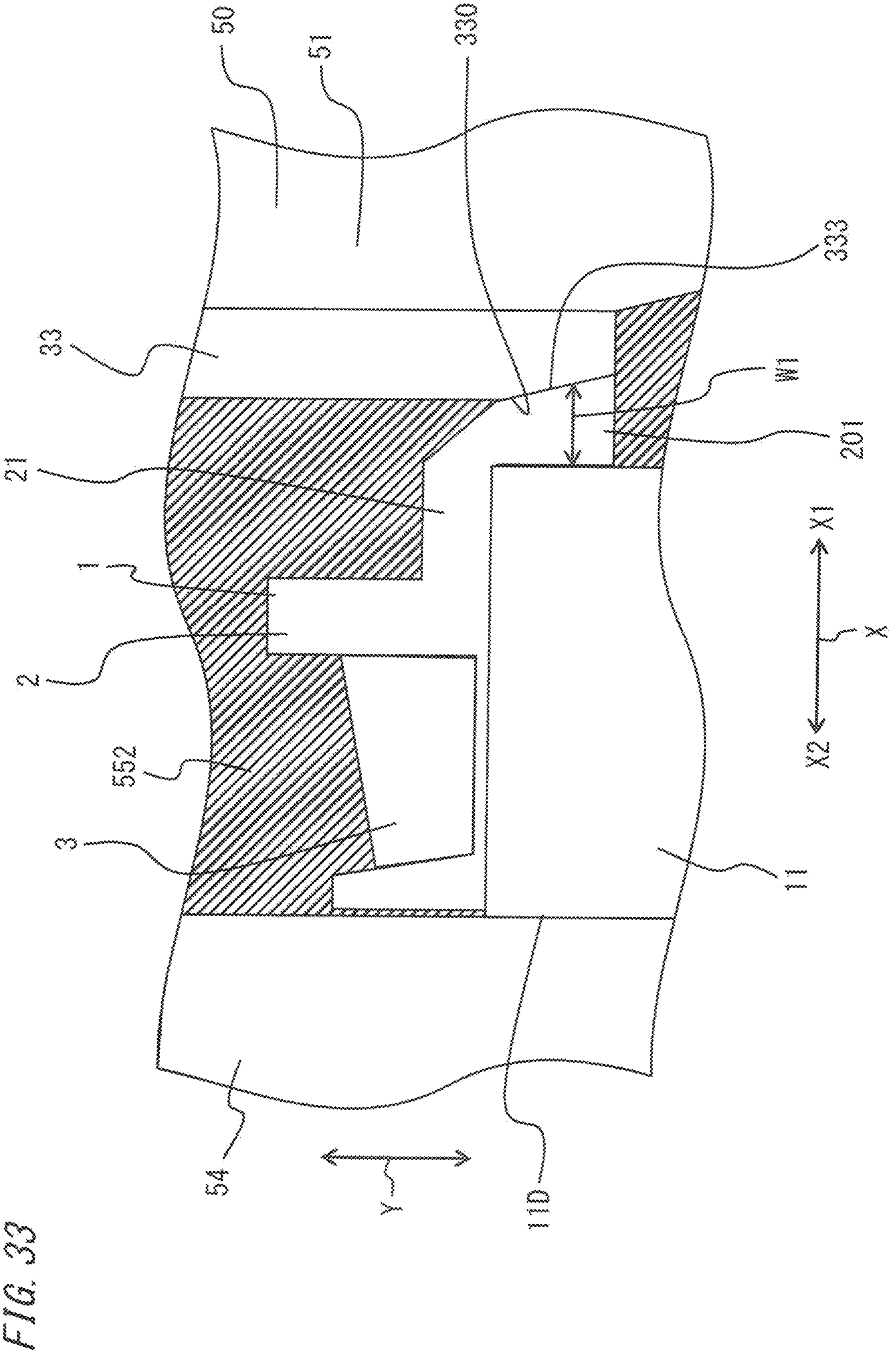
FIG. 33 is an enlarged schematic view showing an arrangement relationship between the molding mold shown in FIG. 32 and the upper side (on the drawing sheet) in the axial direction of the division coil-wound body shown in FIG. 31.
Figure 34:
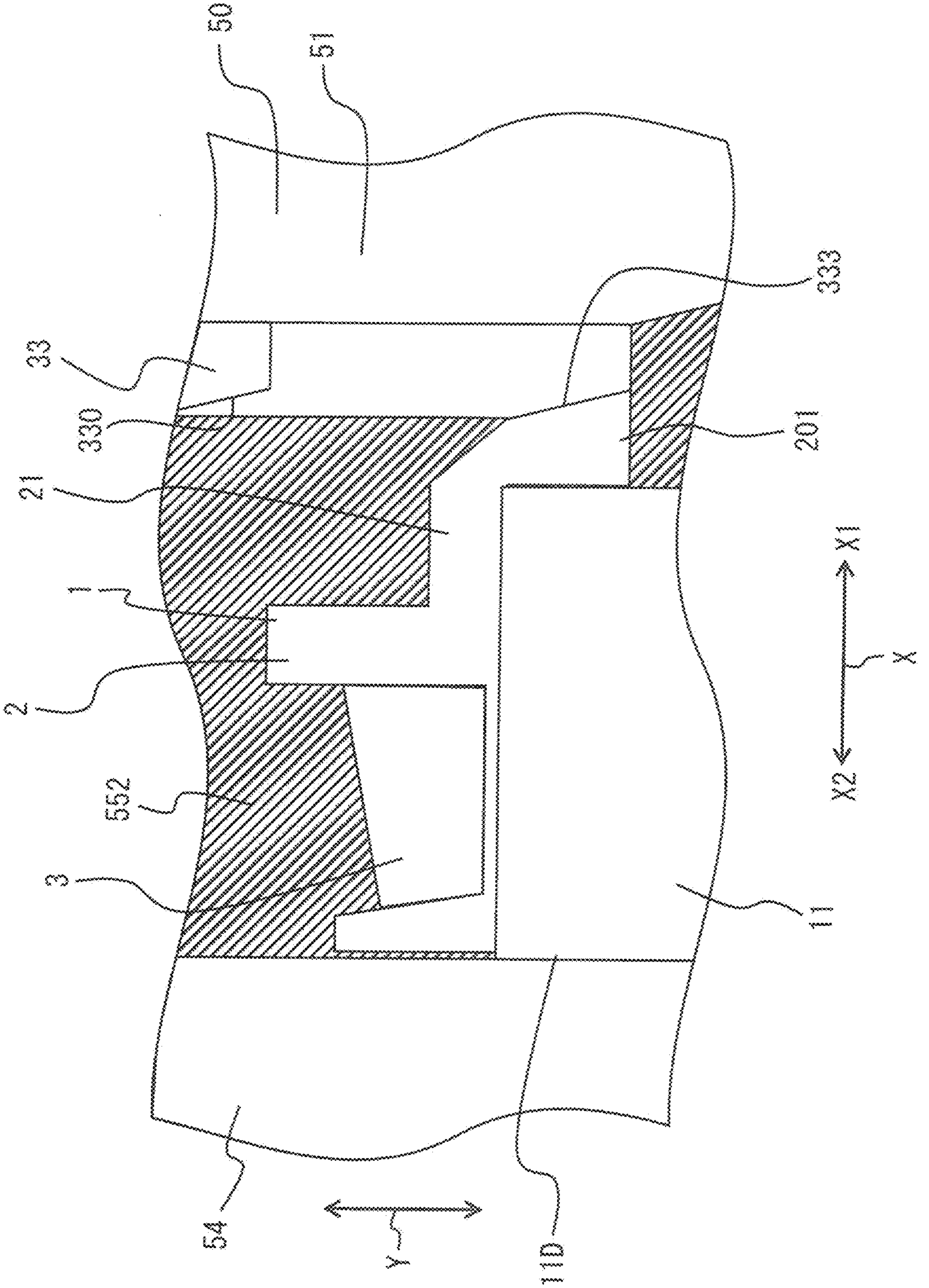
FIG. 34 is an enlarged schematic view showing an arrangement relationship between the molding mold shown in FIG. 32 and the upper side (on the drawing sheet) in the axial direction of the division coil-wound body shown in FIG. 31.
Figure 35:
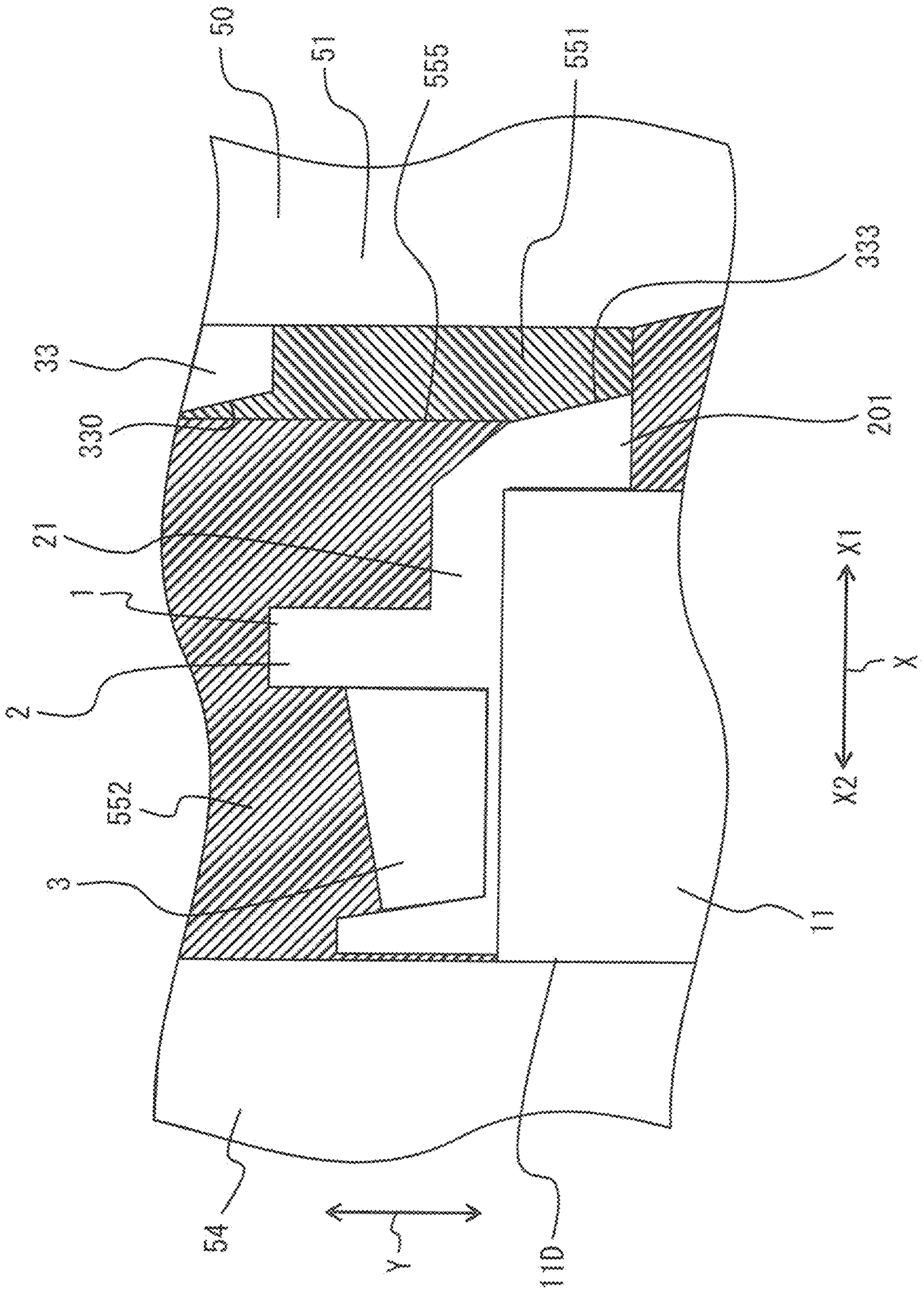
FIG. 35 is an enlarged schematic view showing an arrangement relationship between the molding mold shown in FIG. 32 and the upper side (on the drawing sheet) in the axial direction of the division coil-wound body shown in FIG. 31.

FIG. 30 is a perspective view showing an example of a configuration of a stator according to embodiment 4. FIG. 31 is a side view showing a configuration in which an insulator is disposed on the division core piece used for the stator shown in FIG. 30. FIG. 32 is a schematic cross-sectional view showing a configuration of a molding mold in embodiment 4. Each of FIG. 33 to FIG. 35 is an enlarged schematic view showing the upper side (on the drawing sheet) in the axial direction regarding an arrangement relationship between the division coil-wound body and the molding mold shown in FIG. 32.

The same portions as those in the above embodiments in the drawings are denoted by the same reference characters, and description thereof is omitted. Also, a rotary electrical machine in which the stator 20 configured as described in the present embodiment 4 is used, and a method for manufacturing the rotary electrical machine, are the same as those in the above embodiments, and thus description thereof will be omitted as appropriate.

In actuality, the slope angle of each of the slopes shown in FIG. 32 to FIG. 36 relative to the axial direction Y merely has a value smaller than 10°. Thus, in actuality, distinguishment from surfaces parallel to the axial direction Y is difficult as shown in FIG. 31. Considering this, in FIG. 32 to FIG. 36, the relationship between the slope of each of the protrusion and the extension portion relative to the axial direction Y and the slope of each of the mold inner circumferential surface and a movable pin of the molding mold relative to the axial direction Y is shown in an exaggerated manner.

As shown in FIG. 31, the protrusion 21 is formed on only one end side (the upper side on the drawing sheet of FIG. 31) in the axial direction Y of the division core piece 11. The protrusion 21 has the extension portion 201 formed along the outer circumferential surface 11B on the outer side X1 in the radial direction X of the core-back portion 111 of the division core piece 11 so as to extend to the center side in the axial direction Y. As shown in FIG. 33, the extension portion 201 of the protrusion 21 formed on the one end side in the axial direction Y is formed such that a thickness W1 in the radial direction X of the extension portion 201 decreases toward the one end side (the upper side on the drawing sheet of FIG. 33) in the axial direction Y from a center-side end surface (a lower end on the drawing sheet of FIG. 33) in the axial direction Y of the extension portion 201.

As shown in FIG. 30, the mold resin portion 5 coating the division core pieces 11 and the coils 3 of the stator 20 is composed of: first mold resin portions 551 each coating a surface 333 (see FIG. 33) on the outer side in the radial direction of the extension portion 201 of the protrusion 21 of the corresponding insulator 2; and a second mold resin portion 552 as the other portion. A boundary line (weld line)

555 is formed at the boundary between each of the first mold resin portions 551 and the second mold resin portion 552.

A molding step for the stator 20 according to embodiment 4 configured as described above will be described. Firstly, a molding mold 50 used in this molding step will be described. As shown in FIG. 32, the molding mold 50 used in this molding step includes a movable pin 33 movable in the axial direction Y in addition to the constituents shown in FIG. 8 described in the above embodiment 1. The movable pin 33 has a sloped surface 330 which is tapered toward the tip thereof and which is located on a side where the division coil-wound body 1 is disposed. The sloped surface 300 is formed such that the slope angle thereof relative to the axial direction Y is equal to the slope angle of the surface 333 of the extension portion 201 relative to the axial direction Y.

In the molding step in the present embodiment 4, the division coil-wound body 1 is disposed in the molding mold 50 and mold closing is performed in the same manner as in the above embodiments. Then, the sloped surface 330 of the movable pin 33 is brought into close contact with the surface 333 of the extension portion 201 of the protrusion 21. Thus, unlike in the above embodiments, the extension portion 201 is sandwiched between: the sloped surface 330 of the movable pin 33 instead of the mold inner circumferential surface 51A; and the outer circumferential surface 11B of the core-back portion 111. Consequently, owing to elastic force of the extension portion 201, the division coil-wound body 1 is pressed from the outer side X1 to the inner side X2 in the radial direction X, whereby the distal-end surface 11D of the tooth portion 112 is pressed against the center shaft 54. Thus, the division coil-wound body 1 is prevented from moving owing to a resin pressure during pouring of a mold resin.

In this state, melted mold resin is poured into the cavity 53, to coat the division coil-wound body 1. The state at this time is shown in FIG. 33. As is obvious from FIG. 33, the mold resin filling portions excluding the division coil-wound body 1 and the movable pin 33 becomes the second mold resin portion 552. Therefore, the mold resin does not flow onto the surface 333, of the extension portion 201, which is in contact with the sloped surface 330 of the movable pin 33.

Next, the movable pin 33 is moved away and retracted from the surface 333 of the extension portion 201 before the melted mold resin finishes being poured into the cavity 53. The state at this time is shown in FIG. 34.

Thereafter, the melted mold resin is kept being poured into the cavity 53, whereby the mold resin flows into the place previously occupied by the movable pin 33. Consequently, the corresponding first mold resin portion 551 is formed. The state at this time is shown in FIG. 35. As is obvious from FIG. 35, the first mold resin portion 55 is formed to coat the surface 333 of the extension portion 201, and the corresponding boundary line 555 is formed at the boundary between the first mold resin portion 551 and the second mold resin portion 552. In this manner, the mold resin portion 5 composed of the first mold resin portion 551 and the second mold resin portion 552 can be made through a single step of pouring a mold resin. Thus, exposure of the insulator 2 can be prevented by this step alone.

Figure 36:
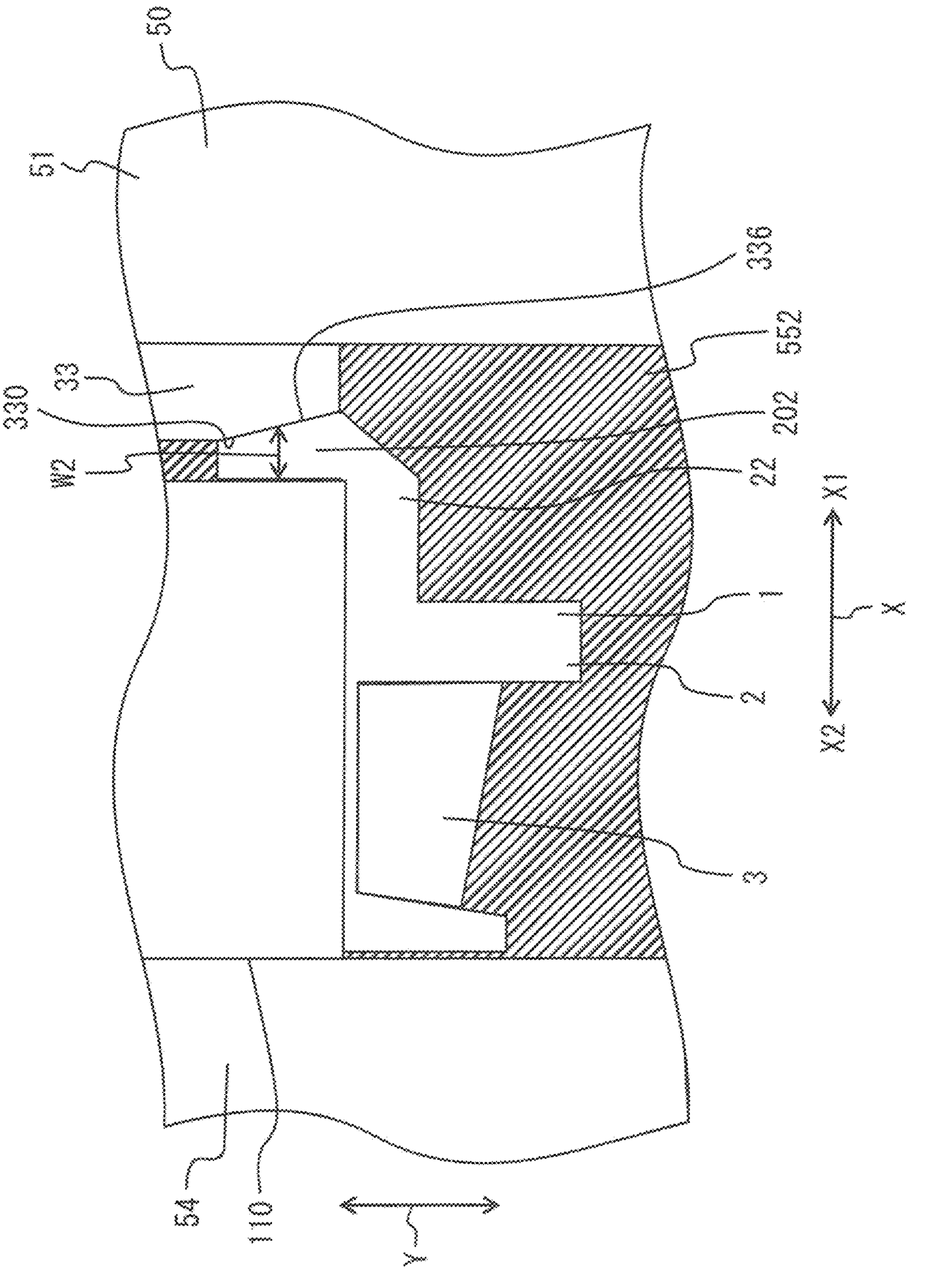
FIG. 36 is an enlarged schematic view showing another arrangement relationship between the division core piece and the molding mold, in embodiment 4.

Although an example in which the protrusion 21 is formed on only the one end side in the axial direction Y of the core-back portion 111 has been described in the above embodiment 4, another example may be provided in which, as shown in FIG. 36, the protrusion 22 is additionally formed on another end side (the lower side on the drawing sheet of FIG. 31) in the axial direction Y of the core-back portion 111. In this case, the extension portion 201 of the protrusion 22 formed on the other end side in the axial direction Y is formed such that a thickness W2 in the radial direction X of the extension portion 202 increases toward the other end side (the lower side on the drawing sheet of FIG. 36) in the axial direction Y from a center-side end surface (the upper side on the drawing sheet of FIG. 36) in the axial direction Y of the extension portion 202. In this case as well, the sloped surface 330 of the movable pin 33 is brought into close contact with a surface 336 on the outer side X1 in the radial direction X of the extension portion 202 of the protrusion 22, and the second mold resin portion 552 is formed. Then, in the same manner as in FIG. 34, the movable pin 33 is retracted from the one end side in the axial direction Y, whereby the corresponding first mold resin portion 551 is formed in the place previously occupied by the movable pin 33, and the corresponding boundary line 555 is formed.

The stator according to embodiment 4 configured as described above is

- a stator including:
- a core having
  - a core-back portion formed in an annular shape and
  - a plurality of tooth portions formed, at intervals in a circumferential direction, on an inner circumferential surface on an inner side in a radial direction of the core-back portion so as to protrude to the inner side in the radial direction;
- a coil wound around each tooth portion with an insulator therebetween; and
- a mold resin portion coating the core and the coil, wherein
- the core-back portion is formed to be discontinuous at at least one position in the circumferential direction,
- the insulator has, at each of two or more positions in the circumferential direction, a protrusion protruding to an outer side in the radial direction beyond an outer circumferential surface of the core-back portion,
- the protrusion is formed on one end side in an axial direction of the core-back portion,
- the protrusion has an extension portion formed along the outer circumferential surface on the outer side in the radial direction of the core-back portion of the core so as to extend to a center side in the axial direction, and
- the extension portion of the protrusion formed on the one end side in the axial direction is formed such that a thickness in the radial direction of the extension portion decreases toward the one end side in the axial direction from a center-side end surface in the axial direction of the extension portion.

Consequently, when the core and the insulator are pressed by the molding mold at the time of forming the mold resin portion, a surface on the outer side in the radial direction of the extension portion of the protrusion on the one end side in the axial direction can be utilized.

Thus, it is possible to provide a stator having favorable roundness without increasing machining cost, equipment cost, or the number of components.

Furthermore, in the stator according to embodiment 4 configured as described above,

- the protrusion is formed also on another end side in the axial direction of the core-back portion, and
- the extension portion of the protrusion formed on the other end side in the axial direction is formed such that a thickness in the radial direction of said extension portion increases toward the other end side in the axial direction from a center-side end surface in the axial direction of said extension portion.

Consequently, when the core and the insulator are pressed by the molding mold at the time of forming the mold resin portion, a surface on the outer side in the radial direction of the extension portion of the protrusion on the other end side in the axial direction can be additionally further utilized.

Thus, it is possible to provide a stator assuredly having favorable roundness without increasing machining cost, equipment cost, or the number of components.

Furthermore, in the stator according to embodiment 4 configured as described above, when the mod resin portion is composed of a first mold resin portion coating a surface on the outer side in the radial direction of the extension portion of the protrusion and a second mold resin portion as a remaining portion, a boundary line is present at a boundary between the first mold resin portion and the second mold resin portion.

Consequently, the surface on the outer side in the radial direction of the extension portion of the protrusion can be coated with the first mold resin portion, and exposure of the insulator can be prevented. Thus, water entry from the boundary between the insulator and the mold resin portion can be prevented.

Furthermore, the method for manufacturing the stator according to embodiment 4 performed as described above is a method including steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion; and a molding step of performing coating with a mold resin without exposing the surface on the outer side in the radial direction of the extension portion of the protrusion, to form the stator, wherein the molding step includes forming the second mold resin portion in a state where a movable pin is in contact with the surface on the outer side in the radial direction of the extension portion of the protrusion and subsequently forming the first mold resin portion in a state where the movable pin is moved away from the surface on the outer side in the radial direction of the extension portion of the protrusion.

Consequently, the surface on the outer side in the radial direction of the extension portion of the protrusion can be coated with the first mold resin portion, and exposure of the insulator can be prevented. Thus, water entry from the boundary between the insulator and the mold resin portion can be prevented.

Embodiment 5

Figure 37:
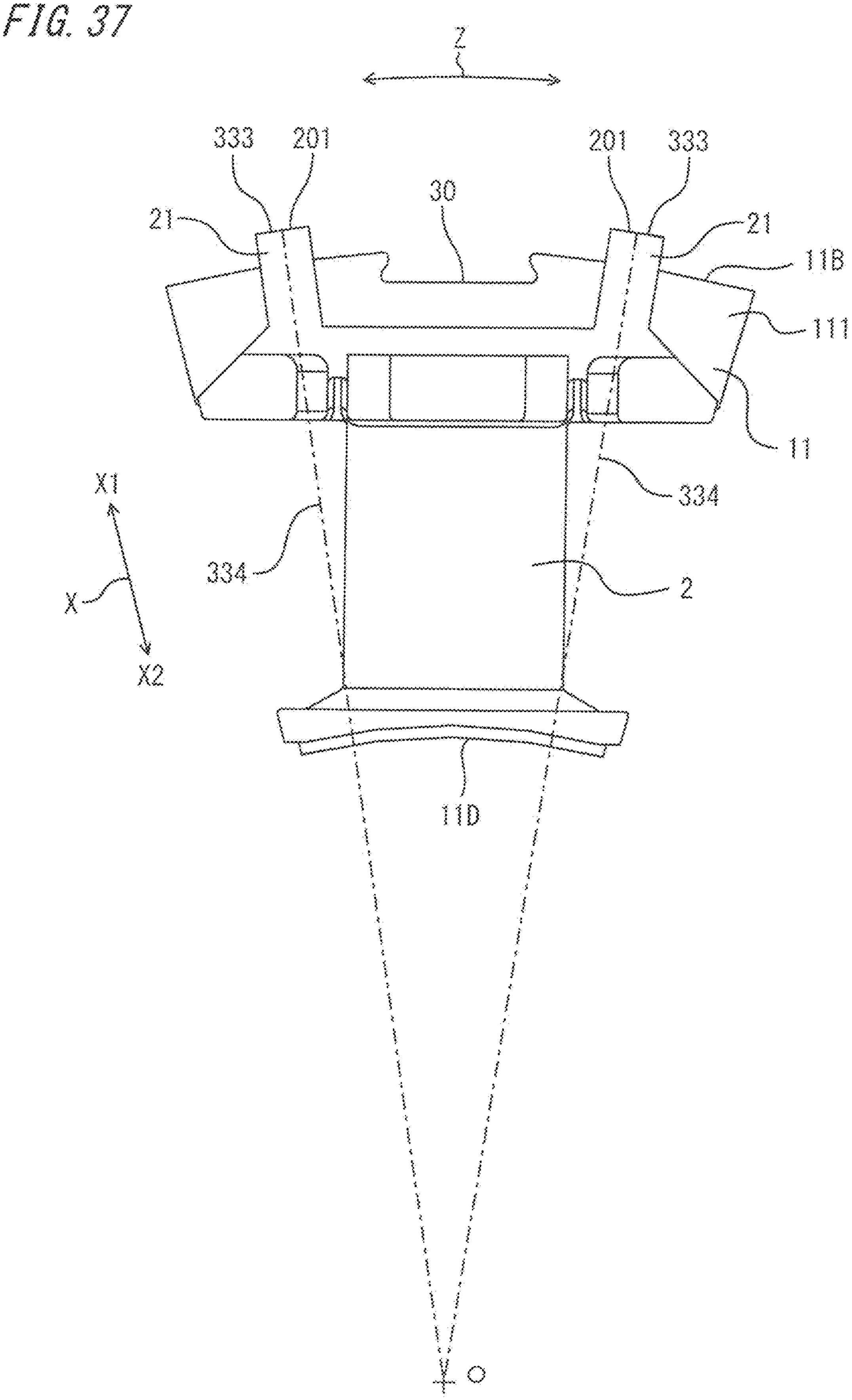
FIG. 37 is a plan view showing a configuration in which an insulator is disposed on a division core piece, in embodiment 5.

FIG. 37 is a plan view showing a configuration in which an insulator is disposed on a division core piece used for a stator according to embodiment 5. In the drawings, the same portions as those in the above embodiments are denoted by the same reference characters, and description thereof is omitted. In the present embodiment 5, description will be given regarding a case where a plurality of (here, two) protrusions are arranged in the circumferential direction for one division core piece, i.e., one tooth portion.

As shown in FIG. 37, two protrusions 21 are arranged in the circumferential direction Z for one division core piece 11. A dovetail groove 30 is formed in the interval in the circumferential direction Z between the two protrusions 21 or the outer circumferential, surface 11B of the core-back portion 111 of the division core piece 11. The dovetail groove 30 is formed to extend from one end to another end in the axial direction Y of the core-back portion 111 of the division core piece 11. The dovetail groove 30 is used for holding the division core piece 11 in the winding step. Each of the extension portions 201 of the two protrusions 21 is formed such that a plane 334 includes a center axis O of the annular core-back portion 111, the plane 334 including a line segment bisecting, in the circumferential direction Z, the surface 333 which extends along the axial direction Y and which is located on the outer side X1 in the radial direction X of the extension portion 201, the plane 334 being perpendicular to the surface 333 on the outer side X1 in the radial direction X of the extension portion 201.

Since the extension portions 201 of the plurality of protrusions 21 are formed in this manner, the plurality of extension portions 201 can be pressed toward the center axis O from the plurality of positions in the circumferential direction Z on the core-back portion 111 in the molding step. Consequently, it is possible to stably press the division core piece 1 against the center shaft 54 (see FIG. 8) while inhibiting the division core piece 11 from being tilted in the circumferential direction Z, and the accuracy of the inner diameter of the division core pieces 11 can be improved.

In addition, since the dovetail groove 30 is provided, and furthermore, the plurality of protrusions 21 can be formed, it is possible to, in the winding step, stably form the coil 3 while holding the division core piece 11 by utilizing the dovetail groove 30.

In the stator according to embodiment 5 configured as described above, a plurality of the protrusions are arranged in the circumferential direction for one said tooth portion, and each of the extension portions of the plurality of the protrusions is formed such that a plane includes a center axis of the annular core-back portion, the plane including a line segment bisecting, in the circumferential direction, a surface on the outer side in the radial direction of the extension portion, the plane being perpendicular to the surface on the outer side in the radial direction of the extension portion.

Consequently, the same advantageous effects as those in the above embodiments are exhibited.

Moreover, at the time of forming the mold resin portion, the core can be held with respect to the molding mold at the plurality of extension portions that are arranged in the circumferential direction for one said tooth portion, whereby the accuracy of the inner diameter of the core can be improved.

Embodiment 6

Figure 38:
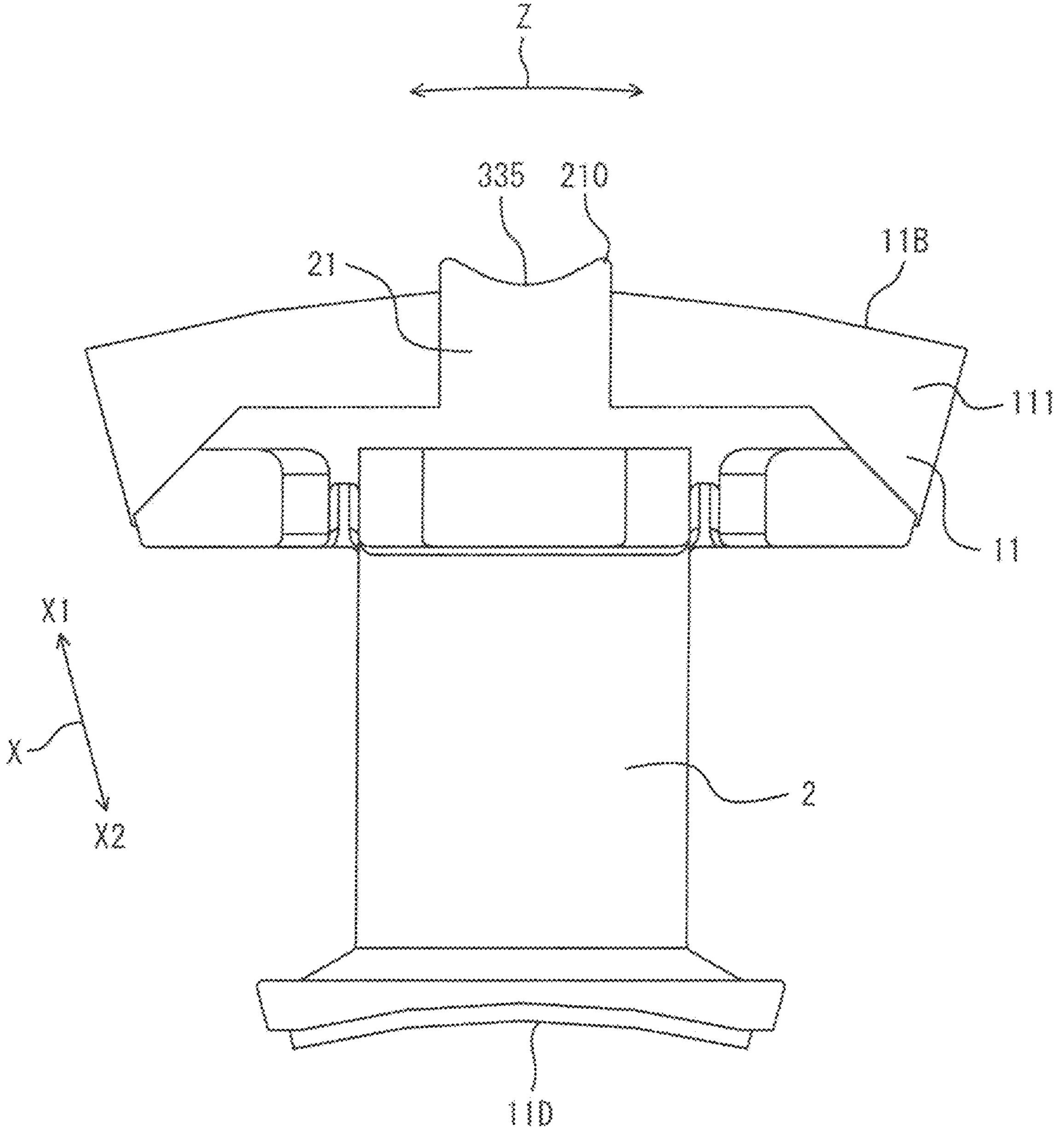
FIG. 38 is a plan view showing a configuration in which an insulator is disposed on a division core piece, in embodiment 6.

FIG. 38 is a plan view showing a configuration in which an insulator is disposed on a division core piece used for a stator according to embodiment 6. In the drawings, the same portions as those in the above embodiments are denoted by the same reference characters, and description thereof is omitted. In the present embodiment 6, as shown in FIG. 38, a surface 335 on the outer side X1 in the radial direction X of the extension portion 201 has a curved surface protruding toward the center axis O (see FIG. 37) of the annular core-back portion 111. Accordingly, the tip of the movable pin 33 (see FIG. 32) described in the above embodiment 4 is formed in, for example, a conical shape. With this configuration, the conical movable pin 33 only has to be brought into contact with the surface 335 formed as a curved surface in the extension portion 202. This eliminates the need for determining the phase of the movable pin 33, whereby disposition of the molding mold 50 is facilitated.

The stator according to embodiment 6 configured as described above exhibits the same advantageous effects as those in the above embodiments.

Moreover, a surface which extends along the axial direction and which is located on the outer side in the radial direction of the extension portion has a curved surface protruding toward a center axis of the annular core-back portion.

Consequently, installation of the mold is facilitated, and the structure of the mold can be simplified.

Embodiment 7

Figure 18:
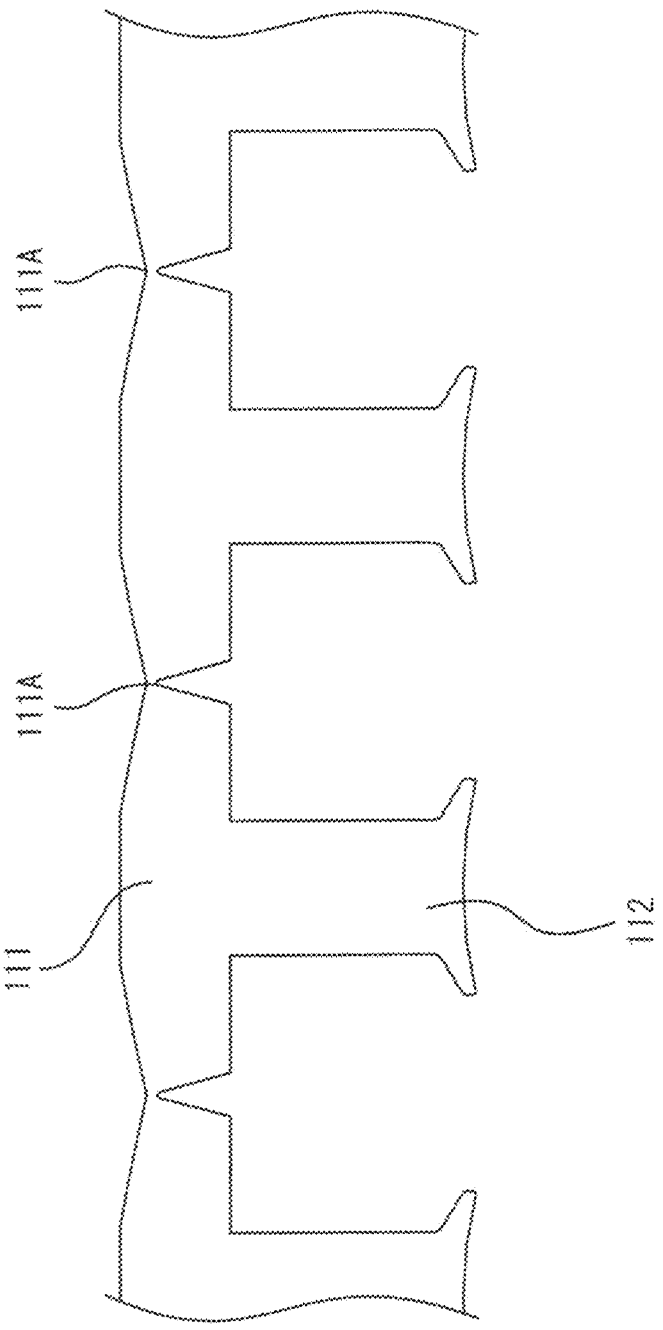
Figure 19:
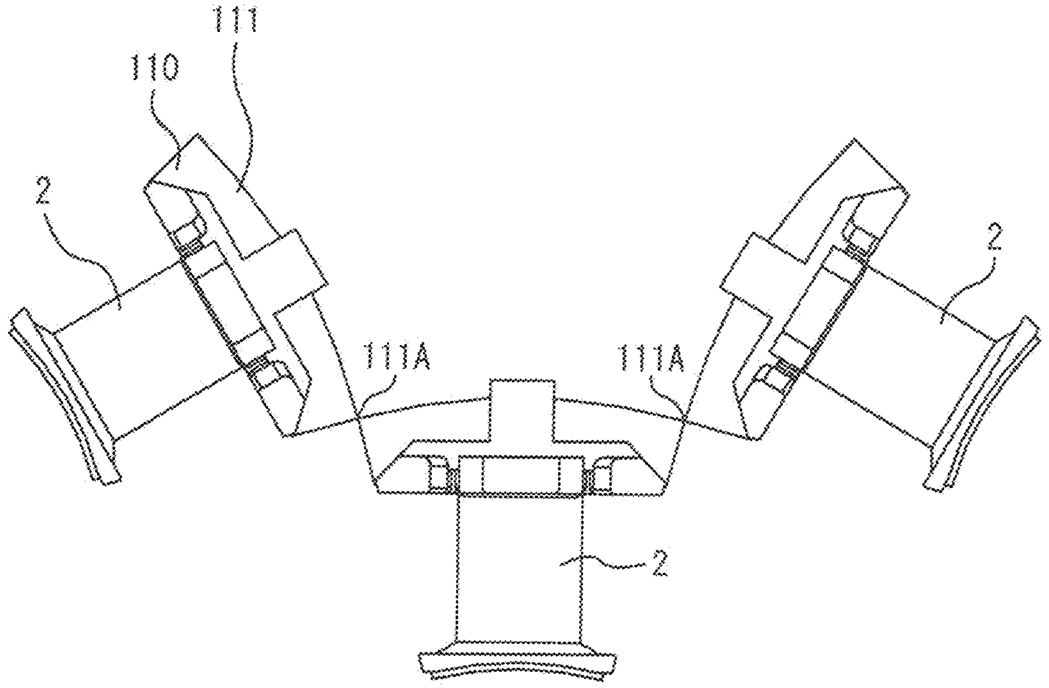
FIG. 19 is a plan view showing a configuration of a core of a stator according to embodiment 7.

FIG. 18 is a plan view showing a configuration of a core of a stator according to embodiment 7. FIG. 19 is a plan view showing a state where a winding step is being performed in the case of disposing insulators on the core shown in FIG. 18. In the drawings, the same portions as those in the above embodiments are denoted by the same reference characters, and description thereof is omitted.

In the present embodiment 7, as shown in FIG. 18, a core 110 is formed as one piece with the core-back portion 111 being made continuous in the circumferential direction Z by small-thickness portions 111A and being formed to be discontinuous at at least one position in the circumferential direction Z. The core 110 which is thus formed is provided with the insulator 2 and set in an inversely warped shape as shown in FIG. 19. This setting can be achieved in a state where gaps between the tooth portions 112 are widened, since the core 110 can be bent at the small-thickness portions 111A.

The winding step can be performed in the state shown in FIG. 19, whereby it is possible to decrease the number of components while accomplishing increase in density at the time of winding. After the winding step, the core 110 is bent at the small-thickness portions 111A into an annular shape such that, in the same manner as in FIG. 5 described in the above embodiment 1, the tooth portions 112 are oriented to the inner side X2 in the radial direction X. Then, the core 110 is disposed in the molding mold 50 in the same manner as in the above embodiments. The subsequent steps are performed in the same manner as in the above embodiments, whereby the stator 20 can be manufactured, and furthermore, the rotary electrical machine 100 can be manufactured.

The stator according to embodiment 7 configured as described above exhibits the same advantageous effects as those in the above embodiments.

Moreover, the core is formed with the core-back portion being made continuous by small-thickness portions at positions, on the core-back portion, between the tooth portions adjacent to each other in the circumferential direction.

Consequently, increase in density at the time of winding can be accomplished, and furthermore, transport performed until the molding step is started, and disposition in the molding mold, can be facilitated.

Embodiment 8

Figure 20:
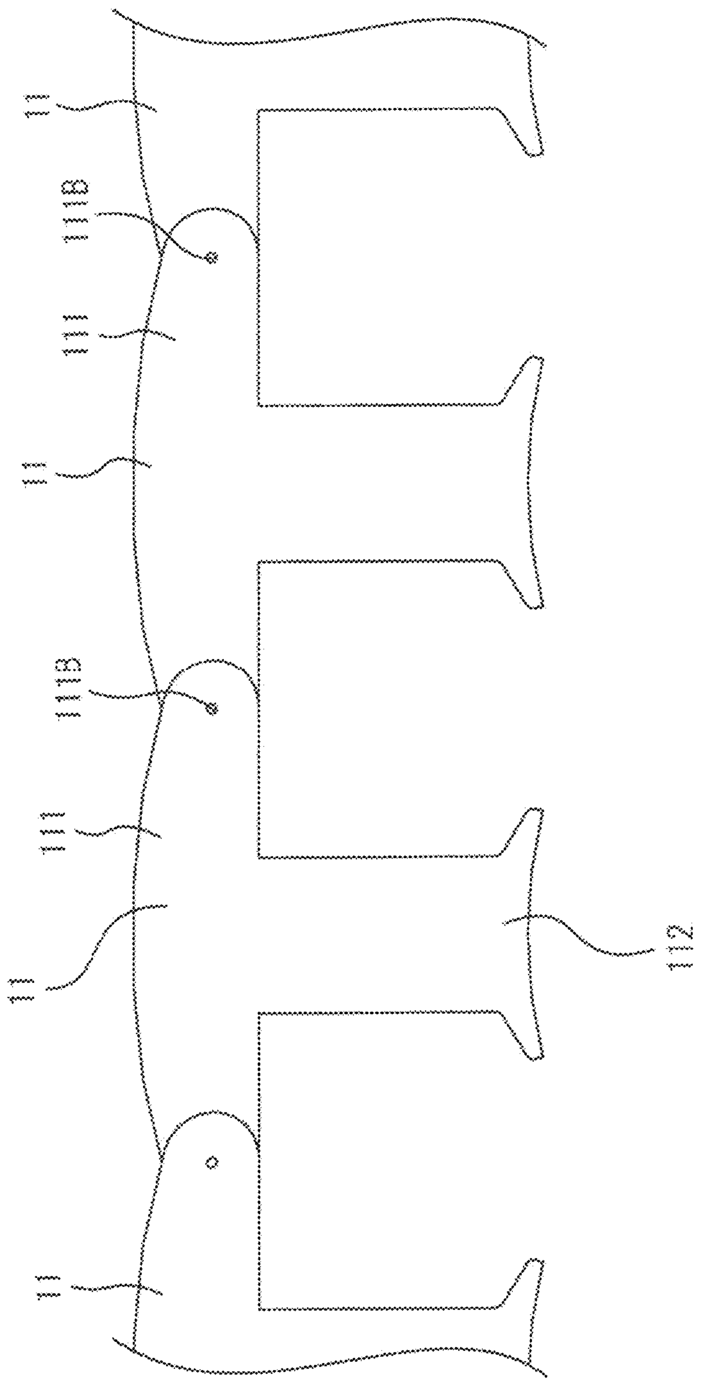
FIG. 20 is a plan view showing a configuration of a core of a stator according to embodiment 8.
Figure 21:
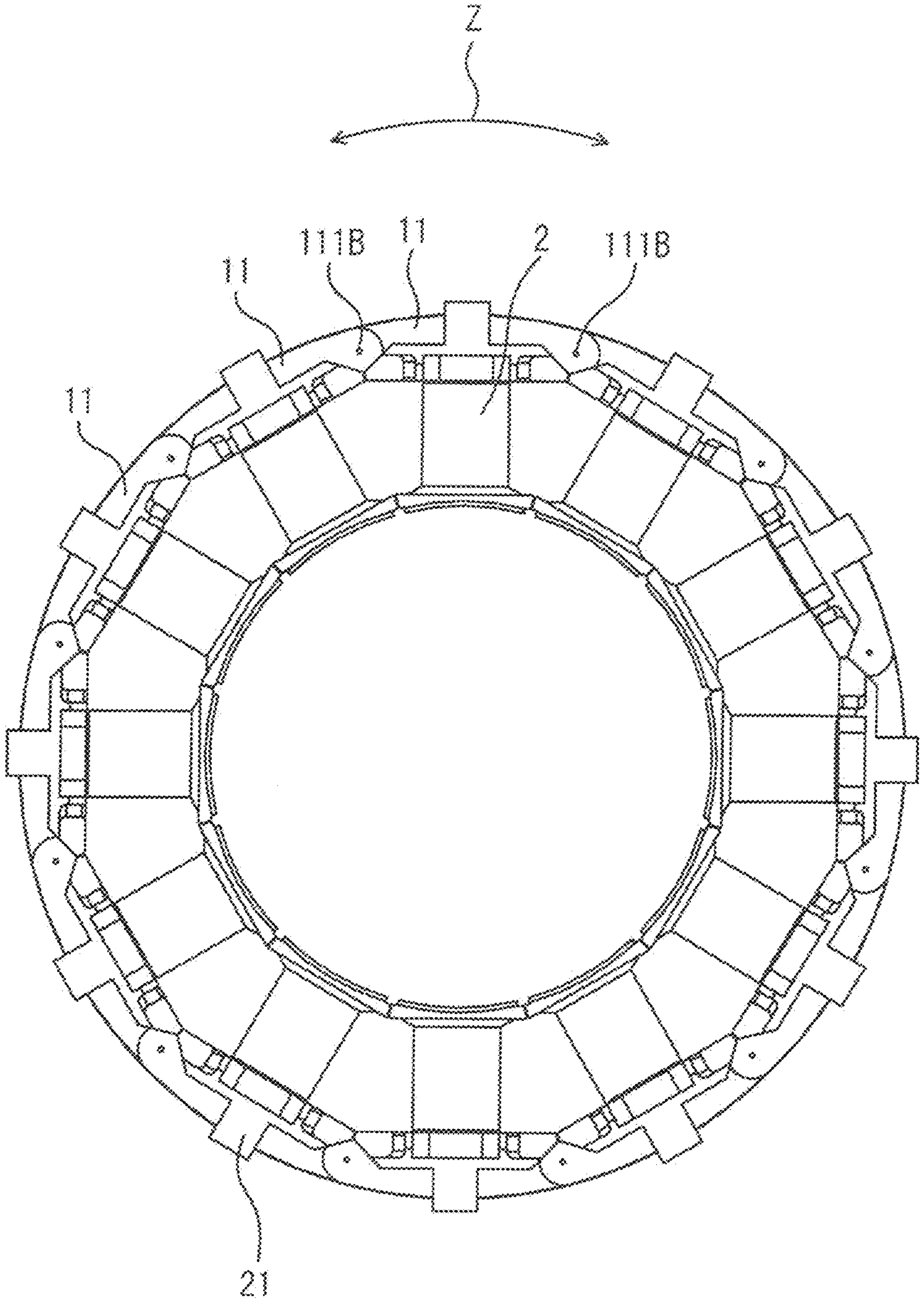
FIG. 21 is a plan view showing a configuration in which the insulators are disposed on the core shown in FIG. 20, and the core is set in an annular shape.
Figure 22:
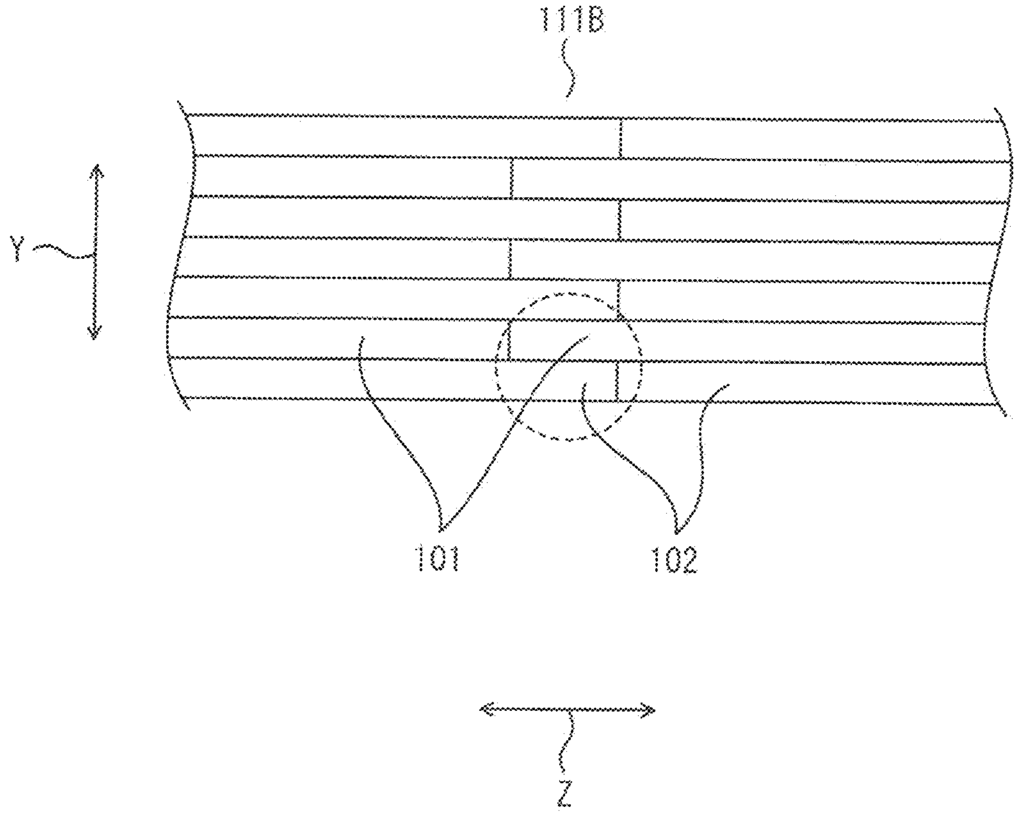
FIG. 22 is a cross-sectional view showing a configuration of connection portions, of the core (shown in FIG. 20), which are stacked in the axial direction.
Figure 23:
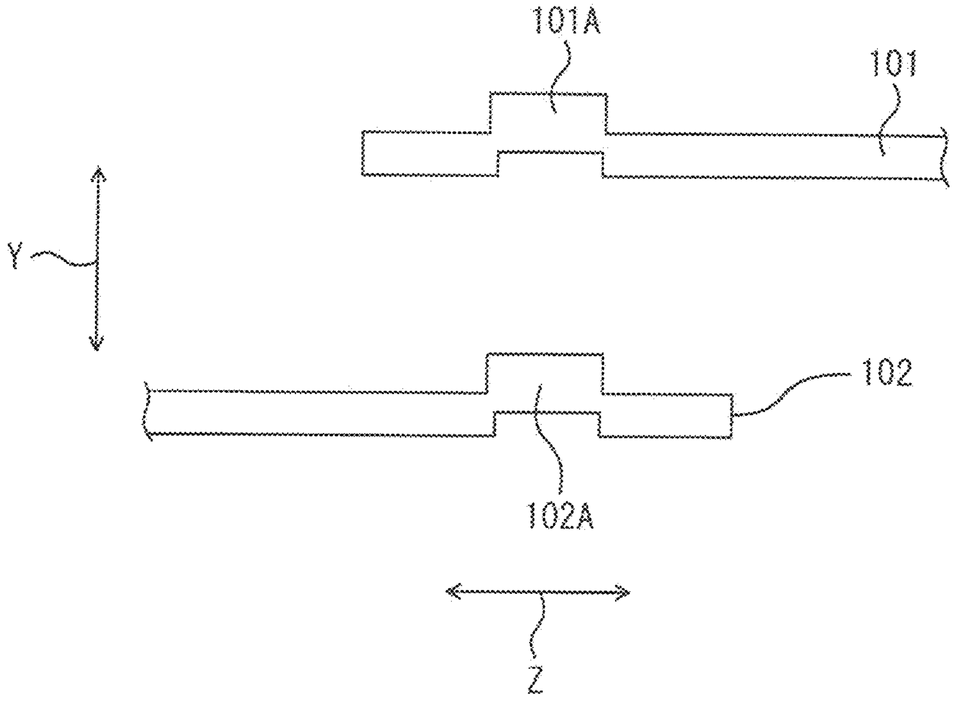
FIG. 23 is a cross-sectional view showing a configuration of one of first core materials and one of second core materials, of the core, stacked in the axial direction shown in FIG. 22.

FIG. 20 is a plan view showing a configuration of a core of a stator according to embodiment 8. FIG. 21 is a plan view showing a configuration in which the insulators are disposed on the core shown in FIG. 20, and the core is set in an annular shape. FIG. 22 is a cross-sectional view showing a configuration of connection portions, of the core (shown in FIG. 20), which are stacked in the axial direction. FIG. 23 is a cross-sectional view showing a configuration of one of first core materials and one of second core materials, of the core, stacked in the axial direction shown in FIG. 22. In the drawings, the same portions as those in the above embodiments are denoted by the same reference characters, and description thereof is omitted.

In the core 110 in FIG. 20, each of the plurality of division core pieces 11 are, at both ends in the circumferential direction Z of the core-back portion 11I thereof, connected by connection portions 1112 which allow rotation. The insulator 2 is disposed on each of the division core pieces 11 connected to each other in the circumferential direction Z by the connection portions shown in FIG. 20, and the core 110 is set in an annular shape. Consequently, the configuration shown in FIG. 21 is obtained.

Each of the connection portions 111 of the division core pieces 11 in the present embodlment 8 will be described with reference to FIG. 2 and FIG. 23. First, as shown in FIG. 22, the division core piece 11 is formed from two types of core materials which are first core materials 101 and second core materials 102, for example. Then, the first core materials 101 and the second core materials 102 are alternately stacked in the axial direction Y. At this time, arrangement is made such that the positions in the circumferential direction Z of core-back portions 111 made from the first core materials 101 and the positions in the circumferential direction Z of core-back portions 111 made from the second core materials 102 are shifted from each other. Consequently, the stacking is performed such that end portions in the circumferential direction Z of the first core materials 101 and end portions in the circumferential direction Z of the second core materials 102 are superposed on each other in the stacking direction.

Then, at each of these portions superposed on each other in the stacking direction, a recess-projection portion 101A is formed in the corresponding first core material 101 and a recess-projection portion 102A is formed in the corresponding second core material 102 as shown in FIG. 23. The recess-projection portions 101A and the recess-projection portions 102A are fitted to each other in the axial direction Y, whereby the connection portions 111B which allow rotation are formed.

In the case of the core 110 which is thus formed, in the winding step after the insulator 2 is disposed, winding can be performed in a state where gaps between the tooth portions 112 of the division core pieces 11 are widened in the same manner as in FIG. 19 regarding the above embodiment 7. After the winding step, in the same manner as in the above embodiment 7, the core 110 is set in an annular shape and is disposed in the molding mold 50 in the same manner. The subsequent steps are performed in the same manner as in the above embodiments, whereby the stator 20 can be manufactured, and furthermore, the rotary electrical machine 100 can be manufactured.

The stator and the rotary electrical machine according to embodiment 8 configured as described above exhibit the same advantageous effects as those in the above embodiments.

Moreover, with the core-back portion being divided in the circumferential direction at positions thereon between the tooth portions adjacent to each other in the circumferential direction, the core is formed by connecting the core-back portions, resulting from the division, to each other in the circumferential direction by connection portions which allow rotation.

Consequently, the plurality of division core pieces are rotatable at the connection portions. Thus, bending can be performed a plurality of times without decreasing the mechanical strength, and pivoting is facilitated. Therefore, improvement of workability and increase in density in the winding step can be accomplished.

Embodiment 9

Figure 24:
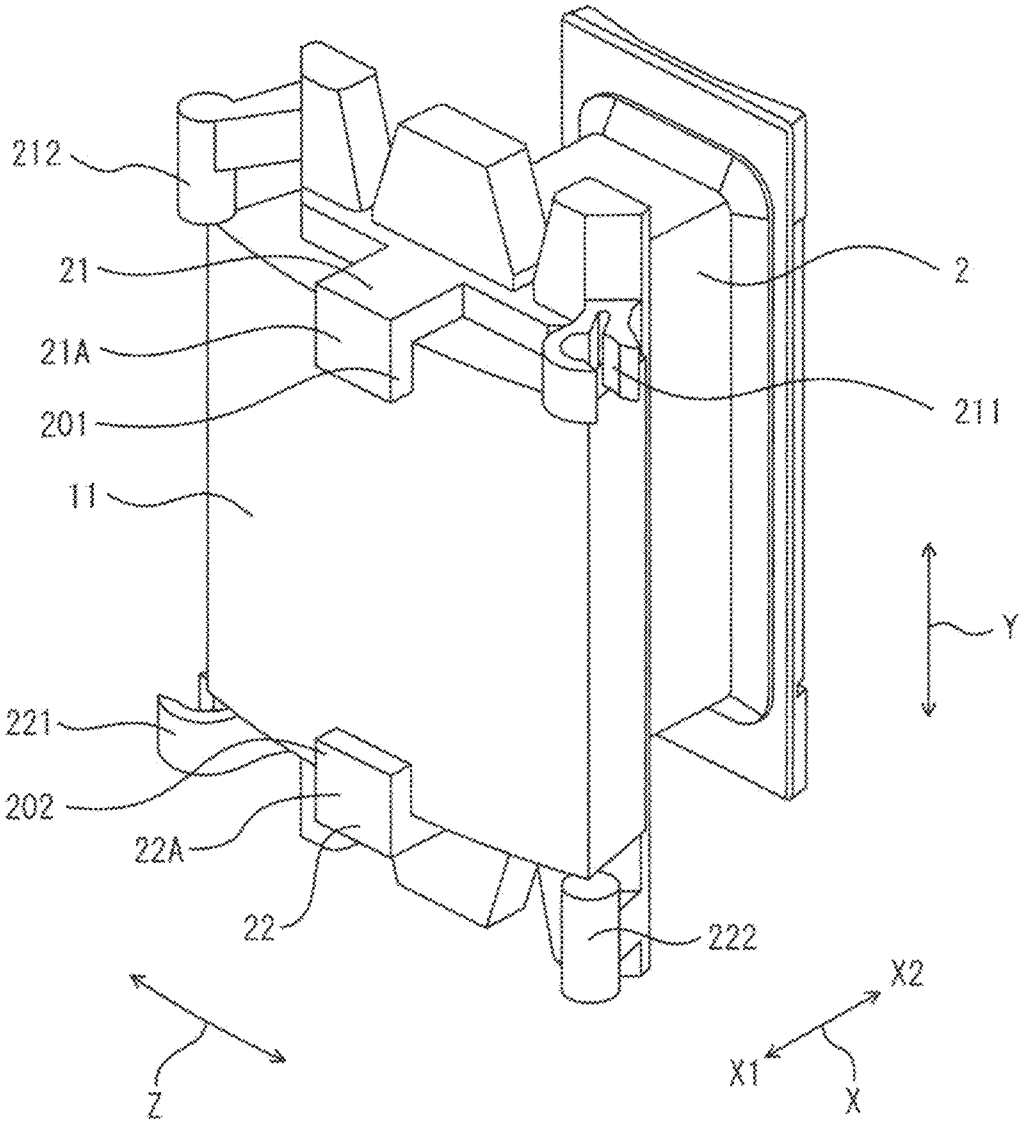
FIG. 24 is a perspective view showing a configuration of an insulator-disposed division core piece in embodiment 9.
Figure 25:
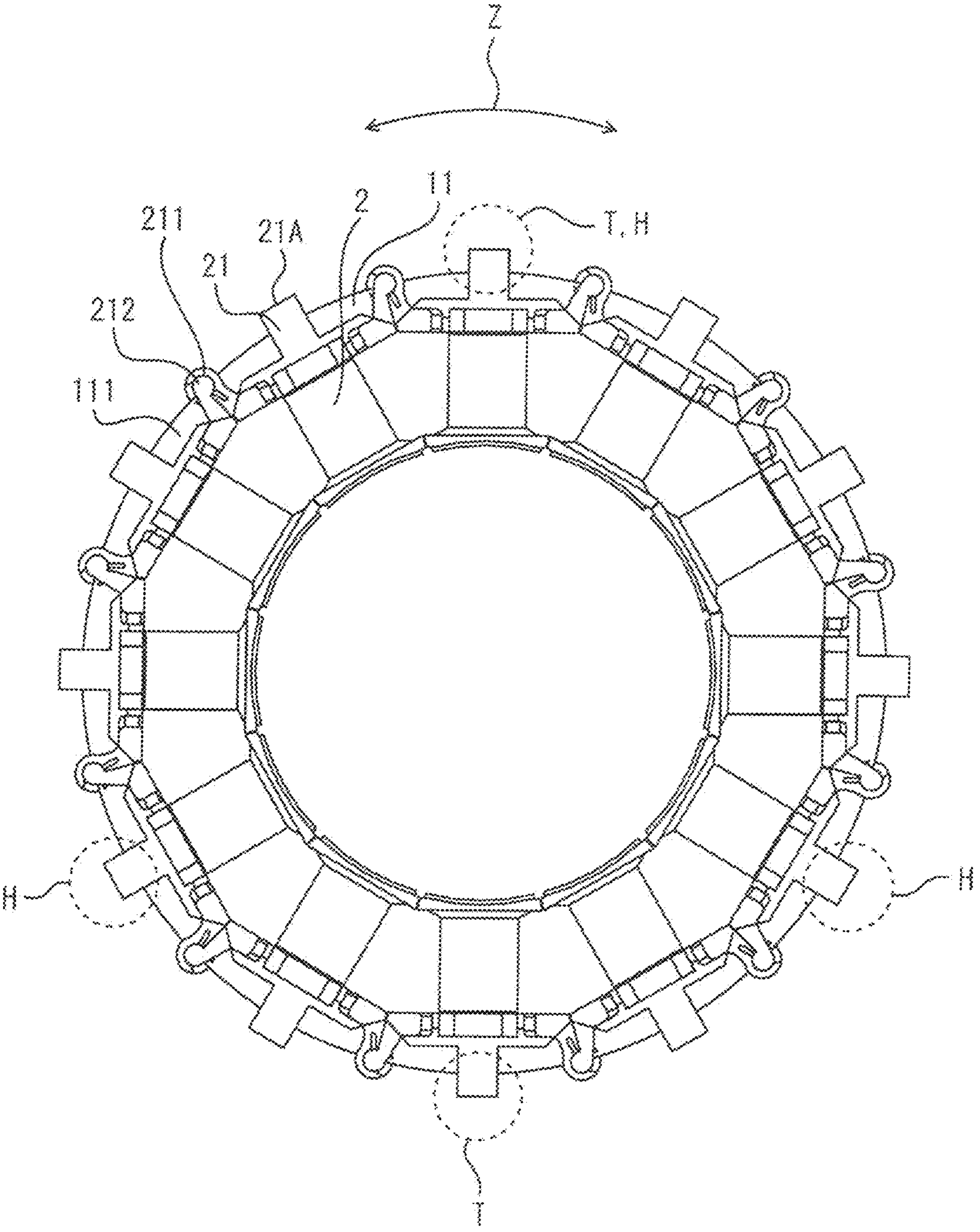
FIG. 25 is a plan view showing a configuration in which a plurality of insulator-disposed division core pieces each of which is the insulator-disposed division core piece shown in FIG. 24 are arranged in an annular pattern.
Figure 26:
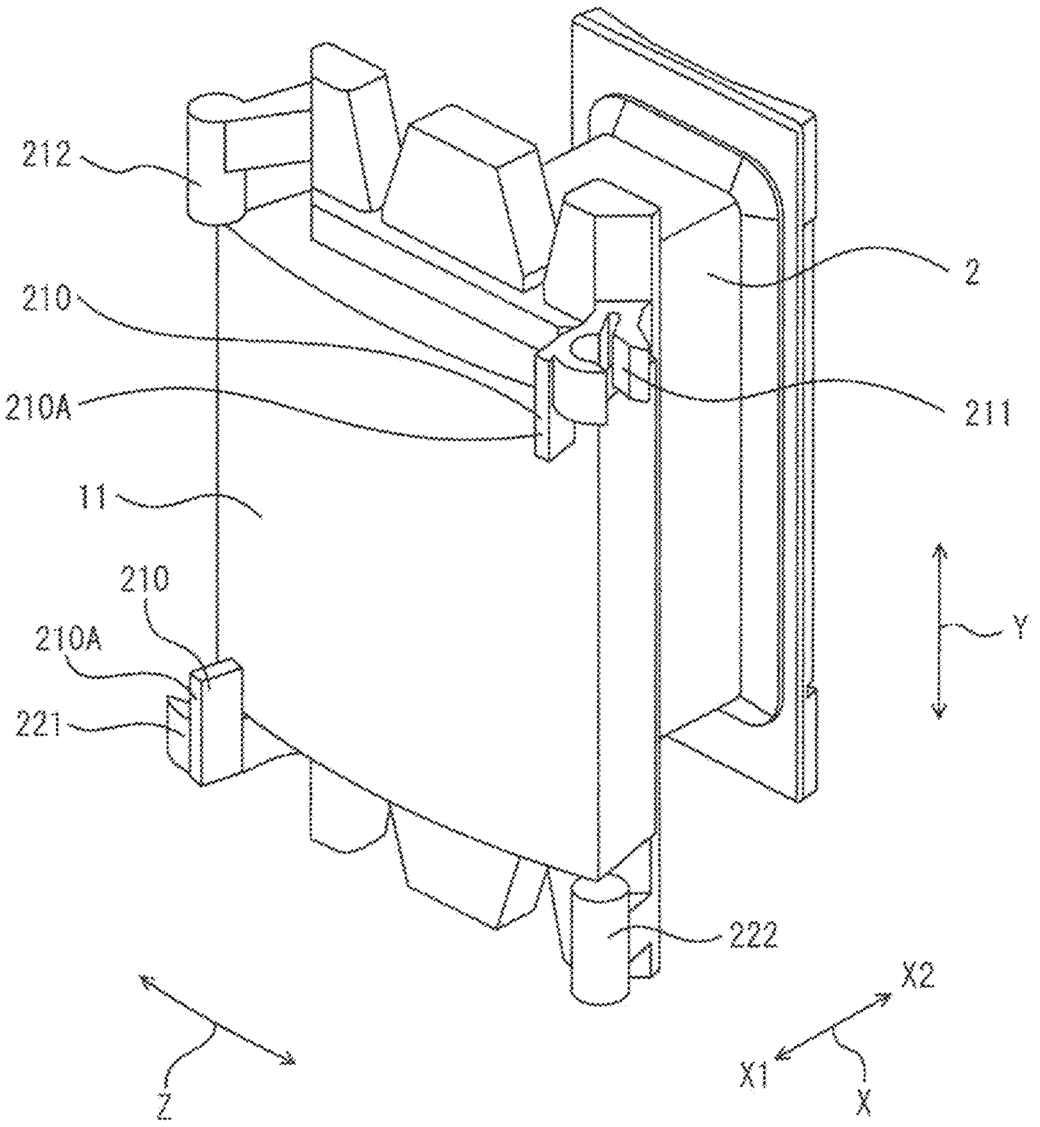
FIG. 26 is a perspective view showing a configuration of another insulator-disposed division core piece in embodiment 9.

FIG. 24 is a perspective view showing a configuration of an insulator-disposed division core piece in embodiment 9. FIG. 25 is a plan view showing a configuration in which a plurality of insulator-disposed division core pieces each of which is the insulator-disposed division core piece shown in FIG. 24 are arranged in an annular pattern. FIG. 26 is a perspective view showing a configuration of another insulator-disposed division core piece in embodiment 9. In the drawings, the same portions as those in the above embodiments are denoted by the same reference characters, and description thereof is omitted.

In the insulator 2 in FIG. 24, an opened-ring portion 211 is formed at a position that is on one end side in the axial direction Y and that is on one end side in the circumferential direction Z, the position being a position at which the division core piece is rotatably connected through snap-fitting. In addition, a pillar-shaped portion 212 is formed at a position that is on the one end side in the axial direction Y and that is on another end side in the circumferential direction Z. In addition, a pillar-shaped portion 222 is formed at a position that is on another end side in the axial direction Y and that is on the one end side in the circumferential direction Z. In addition, an opened-ring portion 221 is formed at a position that is on the other end side in the axial direction Y and that is on the other end side in the circumferential direction Z. Then, with the insulator 2 being disposed on each of the division core pieces 11, the opened-ring portions 211 and the pillar-shaped portions 212 of the division core pieces 11 adjacent to each other in the circumferential direction Z, and the opened-ring portions 221 and the pillar-shaped portions 222 of said division core pieces 11, are connected to each other through snap-fitting. Then, these division core pieces 11 are arranged in an annular pattern as shown in FIG. 25.

In embodiment 9, the adjacent division core pieces 11 are rotatably connected to each other through snap-fitting by the opened-ring portions 211 and 221 and the pillar-shaped portions 212 and 222 of the insulators 2. Thus, in the winding step after the insulator 2 is disposed, winding can be performed in a state where gaps between the tooth portions 112 of the division core pieces 11 are widened in the same manner as in FIG. 19 regarding the above embodiment 7. After the winding step, in the same manner as in the above embodiment 7, the core 110 is set in an annular shape and is disposed in the molding mold 50 in the same manner. The subsequent steps are performed in the same manner as in the above embodiments, whereby the stator 20 can be manufactured, and furthermore, the rotary electrical machine 100 can be manufactured.

In a modification of embodiment 9, as shown in FIG. 26, protrusions 210 to be in contact with the mold inner circumferential surface 51A of the molding mold 50 are formed on the opened-ring portions 211 and 221 instead of the protrusions 21 and 22 of the insulator 2 described above. Furthermore, a protrusion surface 210A which extends along the axial direction Y and is located on the outer side X1 in the radial direction X of each of the protrusions 210 and which is not coated with the mold resin, is formed. The other configurations are the same as those in the above embodiment 9 described with reference to FIG. 24, and the stator 20 and the rotary electrical machine 100 can be manufactured in the same manner. Thus, descriptions of these configurations will be omitted as appropriate.

The stator and the rotary electrical machine according to embodiment 9 configured as described above exhibit the same advantageous effects as those in the above embodiments.

Moreover, the core and the insulator are formed through division in the circumferential direction at positions, on the core-back portion, between the tooth portions adjacent to each other in the circumferential direction, and the insulators resulting from the division include joining portions which are snap-fitted to each other in the circumferential direction and which allow rotation.

Consequently, the plurality of division core pieces are rotatable at the joining portions of the insulators. Thus, bending can be performed a plurality of times without decreasing the mechanical strength, and pivoting is facilitated. Therefore, improvement of workability and increase in density in the winding step can be accomplished. Furthermore, transport performed until the molding step is started, and disposition in the molding mold, can be facilitated.

In the above embodiment 7 to embodiment 9, an example has been described in which the protrusions 21 and 22 of the insulators 2 are formed at all of positions corresponding to the outer sides X1 in the radial direction X of the respective tooth portions 112. However, without limitation thereto, in a case where the core 110 is a core 110 continuous in the circumferential direction Z, or the division core pieces 11 are connected in the circumferential direction Z or connected in the circumferential direction Z by the insulators 2, the protrusions 21 of the insulators 2 do not need to be formed on the outer sides X1 in the radial direction X of all the tooth portions 112. For example, a case where protrusions are formed at only two positions T (enclosed by broken lines in FIG. 24) away from each other by 180° in the circumferential direction Z or are formed at only three positions H (enclosed by broken lines in FIG. 24) away from each other by 120° in the circumferential direction Z, is also conceivable. With this manner of formation, although the rigidity and the roundness become lower than in the case of formation at the positions corresponding to all the tooth portions 112, the amount of materials can be made smaller and manufacturing can be performed at lower cost than in said case.

Furthermore, in each of the above embodiments, an example has been described in which the protrusions 21 and 22 of each of the insulators 2 are formed at both respective ends in the axial direction Y. However, without limitation thereto, a case where a protrusion is formed on only one of the end sides in the axial direction Y (e.g., only the protrusion 21 or only the protrusion 22 in FIG. 4 is formed on the insulator 2) is also conceivable, for example. Although the rigidity and the roundness become lower than in the case of formation at both ends in the axial direction Y, the amount of materials can be made smaller and manufacturing can be performed at lower cost than in said case.

Furthermore, in each of the above embodiments, an example has been described in which the protrusions 21 and 22 of each of the insulators 2 are formed at both respective ends in the axial direction Y. However, without limitation thereto, a case where the protrusions 21 on the one end side in the axial direction Y and the protrusions 22 on the other end side in the axial direction Y are alternately formed in the circumferential direction Z is also conceivable, for example. In this case, in each of the places corresponding to all the tooth portions 112, the corresponding protrusion 21 on the one end side in the axial direction Y or the corresponding protrusion 22 on the other end side in the axial direction Y is formed. Although the rigidity and the roundness become lower than in the case of formation at both ends in the axial direction Y in each of the places corresponding to all the tooth portions 112, the amount of materials can be made smaller and manufacturing can be performed at lower cost than in said case.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which nave not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

Hereinafter, modes of the present disclosure are summarized as additional notes.

(Additional Note 1)

A stator comprising:

a core having a core-back portion formed in an annular shape and a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and a mold resin portion coating the core and the coil, wherein the core-back portion is formed to be discontinuous at at least one position in the circumferential direction, the insulator has, at each of two or more positions in the circumferential direction, a protrusion protruding to an outer side in the radial direction beyond an outer circumferential surface of the core-back portion, and the mold resin portion does not coat a protrusion surface which is located on the outer side in the radial direction of the protrusion and which extends along an axial direction.

(Additional Note 2)

The stator according to additional note 1, wherein the protrusion is formed such that a value obtained by multiplying, by a friction coefficient generated between the protrusion surface of the protrusion and a mold inner circumferential surface for forming the mold resin portion, a load generated in a direction toward the outer side in the radial direction of the protrusion with respect to the mold inner circumferential surface for forming the mold resin portion becomes larger than a load received in the circumferential direction by the protrusion owing to a resin pressure during pouring of a mold resin for the mold resin portion.

(Additional Note 3)

The stator according to additional note 1 or 2, wherein the protrusion is formed on each of both end sides in the axial direction of the core-back portion, and a slope of the protrusion surface of the protrusion on one end side in the axial direction relative to the axial direction and a slope of the protrusion surface of the protrusion on another end side in the axial direction relative to the axial direction are equal to each other (with a slope angle of 0 degrees being excluded).

(Additional Note 4)

The stator according to additional note 1 or 2, wherein the protrusion has an extension portion formed along the outer circumferential surface on the outer side in the radial direction of the core-back portion of the core so as to extend to a center side in the axial direction.

(Additional Note 5)

The stator according to additional note 4, wherein the extension portion is formed along the outer circumferential surface of the core-back portion, and the protrusion surface of the protrusion is formed such that an orientation of a slope of the protrusion surface relative to the axial direction is the same as an orientation of a slope of a mold inner circumferential surface for forming the mold resin portion relative to the axial direction.

(Additional Note 6)

The stator according to additional note 4, wherein the extension portion is formed to be away from the outer circumferential surface of the core-back portion, in a case where an orientation of a slope of a facing surface, of the extension portion, facing the core-back portion relative to the axial direction is the same as an orientation of a slope of a mold inner circumferential surface for forming the mold resin portion relative to the axial direction, the protrusion surface has, as a slope angle, an angle obtained by adding an angle formed between the extension portion and the outer circumferential surface of the core-back portion to a slope angle of the mold inner circumferential surface for forming the mold resin portion, and, in a case where the orientation of the slope of the facing surface, of the extension portion, facing the core-back portion relative to the axial direction differs from the orientation of the slope of the mold inner circumferential surface for forming the mold resin portion relative to the axial direction, the protrusion surface has, as a slope angle, an angle obtained by subtracting the angle formed between the extension portion and the outer circumferential surface of the core-back portion from the slope angle of the mold inner circumferential surface for forming the mold resin portion.

(Additional Note 7)

The stator according to any one of additional notes 1 to 6, wherein the protrusion is formed on each of both end sides in the axial direction of the core-back portion.

(Additional Note 8)

The stator according to any one of additional notes 1 to 7, wherein the core is formed with the core-back portion being made continuous by small-thickness portions at positions, on the core-back portion, between the tooth portions adjacent to each other in the circumferential direction.

(Additional Note 9)

The stator according to any one of additional notes 1 to 7, wherein, with the core-back portion being divided in the circumferential direction at positions thereon between the tooth portions adjacent to each other in the circumferential direction, the core is formed by connecting the core-back portions, resulting from the division, to each other in the circumferential direction by connection portions which allow rotation.

(Additional Note 10)

The stator according to any one of additional notes 1 to 7, wherein the core and the insulator are formed through division in the circumferential direction at positions, on the core-back portion, between the tooth portions adjacent to each other in the circumferential direction, and the insulators resulting from the division include joining portions which are snap-fitted to each other in the circumferential direction and which allow rotation.

(Additional Note 11)

A rotary electrical machine comprising:

the stator according to any one of additional notes 1 to 10;

a rotor rotatably and coaxially disposed on the inner side in the radial direction of the stator; and a bracket which is disposed on at least one end in the axial direction of the stator and which holds a bearing holding a rotation shaft of the rotor.

(Additional Note 12)

A method for manufacturing the stator according to any one of additional notes 1 to 10, the method comprising steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion; and a molding step of performing coating with a mold resin such that the protrusion surface of the protrusion is exposed, to form the stator.

(Additional Note 13)

A method for manufacturing a rotary electrical machine, the method comprising steps to be sequentially performed, the steps being:

a disposition step of disposing a rotatable and coaxial rotor on the inner side in the radial direction of the stator formed through the method for manufacturing the stator according to additional note 12; and an attaching step of attaching, to at least one end in the axial direction of the stator, a bracket which holds a bearing holding a rotation shaft of the rotor.

DESCRIPTION OF THE REFERENCE CHARACTERS

1 division coil-wound body
100 rotary electrical machine
101 first core material
101A recess-projection portion
102 second core material
102A recess-projection portion
11 division core piece
11A inner circumferential surface
11B outer circumferential surface
11C end surface
11D distal-end surface
110 core
111 core-back portion
111A small-thickness portion
111B connection portion
112 tooth portion
2 insulator
20 stator
200 opening
201 extension portion
201A facing surface
202 extension portion
202A facing surface
21 protrusion
21A protrusion surface
21AA partial surface
21AR corner
21B axial-end surface
211 opened-ring portion
212 pillar-shaped portion
22 protrusion
22A protrusion surface
22AA partial surface
22AB partial surface
22AR corner
22B axial-end surface
22C extension distal-end surface
221 opened-ring portion
222 pillar-shaped portion
3 coil
30 dovetail groove
33 movable pin
330 sloped surface
333 surface
334 plane
335 surface
336 surface
40 rotor
41 rotation shaft
42 bearing
5 mold resin portion
50 molding mold
51 movable mold
51A mold inner circumferential surface
52 fixed mold
53 cavity
54 center shaft
55 particle surface
551 first mold resin portion
552 second mold resin portion
555 boundary line
6 first member
7 bracket
O center axis
X radial direction
X1 outer side
X2 inner side
Y axial direction
Z circumferential direction
θ11 slope angle
θ12 slope angle
θ21 slope angle
θ22 slope angle
θ31 slope angle
θ32 slope angle
μN friction coefficient

The invention claimed is:

1. A stator comprising:

a core having a core-back portion formed in an annular shape and a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and a mold resin portion coating the core and the coil, wherein the core-back portion is formed to be discontinuous at at least one position in the circumferential direction, the insulator has, at each of two or more positions in the circumferential direction, a protrusion protruding to an outer side in the radial direction beyond an outer circumferential surface of the core-back portion, the mold resin portion does not coat a protrusion surface which is located on the outer side in the radial direction of the protrusion and which extends along an axial direction, the protrusion is formed on each of both end sides in the axial direction of the core-back portion, and an orientation of a slope of the protrusion surface of the protrusion on one end side in the axial direction relative to the axial direction and an orientation of a slope of the protrusion surface of the protrusion on another end side in the axial direction relative to the axial direction are equal to each other with a slope angle of 0 degrees being excluded.

2. The stator according to claim 1, wherein the protrusion is formed such that a value obtained by multiplying, by a friction coefficient generated between the protrusion surface of the protrusion and a mold inner circumferential surface for forming the mold resin portion, a load generated in a direction toward the outer side in the radial direction of the protrusion with respect to the mold inner circumferential surface for forming the mold resin portion becomes larger than a load received in the circumferential direction by the protrusion owing to a resin pressure during pouring of a mold resin for the mold resin portion.

3. The stator according to claim 1, wherein the protrusion surface which is not coated with the mold resin portion is coated with a first member made from a material different from a material of the mold resin portion.

4. A method for manufacturing the stator according to claim 3, the method comprising steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion;

a molding step of performing coating with a mold resin such that the protrusion surface of the protrusion is exposed, to form the stator; and a coating step of coating the protrusion surface of the protrusion with the first member, the protrusion surface not being coated with the mold resin portion.

5. The stator according to claim 1, wherein the core is formed with the core-back portion being made continuous by small-thickness portions at positions, on the core-back portion, between the tooth portions adjacent to each other in the circumferential direction.

6. The stator according to claim 1, wherein, with the core-back portion being divided in the circumferential direction at positions thereon between the tooth portions adjacent to each other in the circumferential direction, the core is formed by connecting the core-back portions, resulting from the division, to each other in the circumferential direction by connection portions which allow rotation.

7. The stator according to claim 1, wherein the core and the insulator are formed through division in the circumferential direction at positions, on the core-back portion, between the tooth portions adjacent to each other in the circumferential direction, and the insulators resulting from the division include joining portions which are snap-fitted to each other in the circumferential direction and which allow rotation.

8. A rotary electrical machine comprising:

the stator according to claim 1;

a rotor rotatably and coaxially disposed on the inner side in the radial direction of the stator; and a bracket which is disposed on at least one end in the axial direction of the stator and which holds a bearing holding a rotation shaft of the rotor.

9. A method for manufacturing the stator according to claim 1, the method comprising steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion; and a molding step of performing coating with a mold resin such that the protrusion surface of the protrusion is exposed, to form the stator.

10. A method for manufacturing a rotary electrical machine, the method comprising steps to be sequentially performed, the steps being:

a disposition step of disposing a rotatable and coaxial rotor on the inner side in the radial direction of the stator formed through the method for manufacturing the stator according to claim 9; and an attaching step of attaching, to at least one end in the axial direction of the stator, a bracket which holds a bearing holding a rotation shaft of the rotor.

11. A stator comprising:

a core having a core-back portion formed in an annular shape and a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and a mold resin portion coating the core and the coil, wherein the core-back portion is formed to be discontinuous at at least one position in the circumferential direction, the insulator has, at each of two or more positions in the circumferential direction, a protrusion protruding to an outer side in the radial direction beyond an outer circumferential surface of the core-back portion, the mold resin portion does not coat a protrusion surface which is located on the outer side in the radial direction of the protrusion and which extends along an axial direction, and the protrusion has an extension portion formed along the outer circumferential surface on the outer side in the radial direction of the core-back portion of the core so as to extend to a center side in the axial direction.

12. The stator according to claim 11, wherein the extension portion is formed along the outer circumferential surface of the core-back portion, and the protrusion surface of the protrusion is formed such that an orientation of a slope of the protrusion surface relative to the axial direction is the same as an orientation of a slope of a mold inner circumferential surface for forming the mold resin portion relative to the axial direction.

13. The stator according to claim 11, wherein the extension portion is formed to be away from the outer circumferential surface of the core-back portion, in a case where an orientation of a slope of a facing surface, of the extension portion, facing the core-back portion relative to the axial direction is the same as an orientation of a slope of a mold inner circumferential surface for forming the mold resin portion relative to the axial direction, the protrusion surface has, as a slope angle, an angle obtained by adding an angle formed between the extension portion and the outer circumferential surface of the core-back portion to a slope angle of the mold inner circumferential surface for forming the mold resin portion, and, in a case where the orientation of the slope of the facing surface, of the extension portion, facing the core-back portion relative to the axial direction differs from the orientation of the slope of the mold inner circumferential surface for forming the mold resin portion relative to the axial direction, the protrusion surface has, as a slope angle, an angle obtained by subtracting the angle formed between the extension portion and the outer circumferential surface of the core-back portion from the slope angle of the mold inner circumferential surface for forming the mold resin portion.

14. A stator comprising:

a core having a core-back portion formed in an annular shape and a plurality of tooth portions formed, at intervals in a circumferential direction, on an inner circumferential surface on an inner side in a radial direction of the core-back portion so as to protrude to the inner side in the radial direction;

a coil wound around each tooth portion with an insulator therebetween; and a mold resin portion coating the core and the coil, wherein the core-back portion is formed to be discontinuous at at least one position in the circumferential direction, the insulator has, at each of two or more positions in the circumferential direction, a protrusion protruding to an outer side in the radial direction beyond an outer circumferential surface of the core-back portion, the protrusion is formed on one end side in an axial direction of the core-back portion, the protrusion has an extension portion formed along the outer circumferential surface on the outer side in the radial direction of the core-back portion of the core so as to extend to a center side in the axial direction, and the extension portion of the protrusion formed on the one end side in the axial direction is formed such that a thickness in the radial direction of the extension portion decreases toward the one end side in the axial direction from a center-side end surface in the axial direction of the extension portion.

15. The stator according to claim 14, wherein the protrusion is formed also on another end side in the axial direction of the core-back portion, and the extension portion of the protrusion formed on the other end side in the axial direction is formed such that a thickness in the radial direction of said extension portion increases toward the other end side in the axial direction from a center-side end surface in the axial direction of said extension portion.

16. The stator according to claim 14, wherein a plurality of the protrusions are arranged in the circumferential direction for one said tooth portion, and each of the extension portions of the plurality of the protrusions is formed such that a plane includes a center axis of the annular core-back portion, the plane including a line segment bisecting, in the circumferential direction, a surface on the outer side in the radial direction of the extension portion, the plane being perpendicular to the surface on the outer side in the radial direction of the extension portion.

17. The stator according to claim 14, wherein a surface which extends along the axial direction and which is located on the outer side in the radial direction of the extension portion has a curved surface protruding toward a center axis of the annular core-back portion.

18. The stator according to claim 14, wherein, when the mold resin portion is composed of a first mold resin portion coating a surface on the outer side in the radial direction of the extension portion of the protrusion and a second mold resin portion as a remaining portion, a boundary line is present at a boundary between the first mold resin portion and the second mold resin portion.

19. A method for manufacturing the stator according to claim 18, the method comprising steps to be sequentially performed, the steps being:

an assembling step of disposing the insulator on the core;

a winding step of forming the coil on each tooth portion of the core with the insulator therebetween;

an in-mold disposition step of disposing the core in a molding mold for forming the mold resin portion; and a molding step of performing coating with a mold resin without exposing the surface on the outer side in the radial direction of the extension portion of the protrusion, to form the stator, wherein the molding step includes forming the second mold resin portion in a state where a movable pin is in contact with the surface on the outer side in the radial direction of the extension portion of the protrusion and subsequently forming the first mold resin portion in a state where the movable pin is moved away from the surface on the outer side in the radial direction of the extension portion of the protrusion.

* * * * *